(12) United States Patent
Gosling et al.

(10) Patent No.: US 9,649,831 B2
(45) Date of Patent: May 16, 2017

(54) PERFORATED ACOUSTIC TILES

(71) Applicant: DIRTT Environmental Solutions, Ltd., Calgary (CA)

(72) Inventors: Geoff Gosling, Calgary (CA); Mogens F. Smed, DeWinton (CA)

(73) Assignee: DIRTT Environmental Solutions, LTD, Calgary (CA)

( * ) Notice: Subject to any disclaimer, the term of this patent is extended or adjusted under 35 U.S.C. 154(b) by 0 days.

(21) Appl. No.: 14/722,642

(22) Filed: May 27, 2015

(65) Prior Publication Data
US 2015/0259903 A1    Sep. 17, 2015

Related U.S. Application Data

(66) Continuation-in-part of application No. 14/113,252, Substitute for application No. PCT/US2013/063488, filed on Oct. 4, 2013.
(Continued)

(51) Int. Cl.
*E04B 1/84* (2006.01)
*B32B 38/00* (2006.01)
(Continued)

(52) U.S. Cl.
CPC ........ *B32B 38/0004* (2013.01); *B32B 3/266* (2013.01); *B32B 7/08* (2013.01); *B32B 7/12* (2013.01); *B32B 21/02* (2013.01); *B32B 21/042* (2013.01); *B32B 21/13* (2013.01); *B32B 21/14* (2013.01); *E04B 2/02* (2013.01); *E04B 2/7422* (2013.01); *B32B 2250/02* (2013.01); *B32B 2307/102* (2013.01); *B32B 2419/04* (2013.01); *E04B 1/86* (2013.01); *E04B 2/7409* (2013.01); *E04B 2001/8461* (2013.01);
(Continued)

(58) Field of Classification Search
CPC ................ B32B 38/0004; B32B 3/266; E04B 2001/8263; E04B 2001/8433; E04B 2001/848; E04B 2001/8495
USPC .................. 181/30, 210, 287, 290, 291, 293
See application file for complete search history.

(56) References Cited

U.S. PATENT DOCUMENTS

D26,071 S    9/1896  Howland
1,715,853 A  6/1929  Madsen
(Continued)

FOREIGN PATENT DOCUMENTS

DE    2802151    7/1979
EP    1712694    10/2006
(Continued)

OTHER PUBLICATIONS

International Search Report and Written Opinion for PCT/US2013/063580 mailed Jan. 17, 2014.
(Continued)

*Primary Examiner* — Jeremy Luks
(74) *Attorney, Agent, or Firm* — Workman Nydegger

(57) ABSTRACT

An acoustic tile used for a modular wall system includes a substrate layer having a plurality of holes that extend at least partially through the substrate layer, and a veneer layer having a plurality of microholes extending at least partially therethrough. The two layers are attached together and configured for attachment to a frame of a modular wall system such that they provide desired acoustic properties to the modular wall system.

15 Claims, 14 Drawing Sheets

Related U.S. Application Data

(60) Provisional application No. 61/710,592, filed on Oct. 5, 2012.

(51) Int. Cl.
| | | |
|---|---|---|
| *E04B 2/02* | (2006.01) | |
| *B32B 3/26* | (2006.01) | |
| *B32B 21/02* | (2006.01) | |
| *B32B 21/04* | (2006.01) | |
| *B32B 21/13* | (2006.01) | |
| *B32B 21/14* | (2006.01) | |
| *B32B 7/08* | (2006.01) | |
| *B32B 7/12* | (2006.01) | |
| *E04B 2/74* | (2006.01) | |
| *E04B 1/86* | (2006.01) | |

(52) U.S. Cl.
CPC .......... *E04B 2001/8476* (2013.01); *E04B 2001/8485* (2013.01); *E04B 2002/0202* (2013.01); *E04B 2002/0256* (2013.01); *E04B 2002/7461* (2013.01); *E04B 2002/7462* (2013.01); *E04B 2002/7487* (2013.01); *Y10T 29/4957* (2015.01); *Y10T 156/1056* (2015.01); *Y10T 156/1064* (2015.01)

(56) References Cited

U.S. PATENT DOCUMENTS

| | | | |
|---|---|---|---|
| D172,998 S | 9/1954 | Sumner | |
| 2,996,157 A | 8/1961 | Rauth | |
| 3,159,236 A * | 12/1964 | Akerson | E04B 1/86 144/365 |
| 3,174,580 A * | 3/1965 | Schulz | E04B 1/86 181/290 |
| 3,177,970 A * | 4/1965 | Boschi | E04B 9/001 181/290 |
| D204,057 S | 3/1966 | Logan | |
| 3,358,411 A | 12/1967 | Birum | |
| 3,526,065 A | 9/1970 | Lee | |
| 3,526,066 A | 9/1970 | Gamble | |
| 3,770,560 A * | 11/1973 | Elder | E01F 8/0076 181/286 |
| 4,076,100 A * | 2/1978 | Davis | E04B 1/90 181/290 |
| 4,084,367 A | 4/1978 | Saylor | |
| 4,269,005 A | 5/1981 | Timmons | |
| 4,417,426 A | 11/1983 | Meng | |
| 4,535,577 A | 8/1985 | Tenser | |
| 4,546,591 A | 10/1985 | Beltz | |
| 4,555,889 A | 12/1985 | Mankowski | |
| 4,708,189 A | 11/1987 | Ward | |
| D300,803 S | 4/1989 | Whitley | |
| 4,844,109 A | 7/1989 | Navarro | |
| D306,689 S | 3/1990 | Hamann | |
| 4,914,873 A | 4/1990 | Newhouse | |
| D313,933 S | 1/1991 | Petley | |
| 5,024,030 A | 6/1991 | Morrison | |
| 5,050,353 A | 9/1991 | Rogers | |
| 5,134,826 A | 8/1992 | La Roche | |
| 5,155,955 A | 10/1992 | Ball | |
| 5,172,530 A | 12/1992 | Fishel | |
| 5,195,286 A | 3/1993 | DeLong | |
| 5,297,368 A | 3/1994 | Okada | |
| D348,384 S | 7/1994 | Karsten | |
| 5,349,794 A | 9/1994 | Taga | |
| 5,487,402 A | 1/1996 | Clary | |
| 5,642,593 A * | 7/1997 | Shieh | E04B 2/7424 160/130 |
| 5,732,802 A | 3/1998 | Tsukagoshi | |
| 5,735,100 A | 4/1998 | Campbell | |
| 5,852,904 A | 12/1998 | Yu | |
| 5,906,080 A | 5/1999 | Digirolamo | |
| 5,934,028 A | 8/1999 | Taylor | |
| D429,998 S | 8/2000 | Snell | |
| 6,170,202 B1 | 1/2001 | Davoodi | |
| 6,260,324 B1 * | 7/2001 | Miedema | E04B 2/7437 52/239 |
| 6,284,351 B1 * | 9/2001 | Sensenig | B32B 5/26 106/816 |
| 6,351,917 B1 | 3/2002 | MacDonald | |
| 6,434,895 B1 | 8/2002 | Hosterman | |
| 6,502,357 B1 | 1/2003 | Stuthman | |
| 6,598,351 B2 | 7/2003 | Hallberg | |
| 6,675,551 B1 * | 1/2004 | Fuchs | E04B 1/86 52/144 |
| 6,679,016 B2 | 1/2004 | Liu | |
| 6,720,069 B1 * | 4/2004 | Murakami | G10K 11/16 428/131 |
| 6,782,971 B2 * | 8/2004 | Dutton | E04B 1/80 181/179 |
| 6,889,477 B1 | 5/2005 | Kottman | |
| 7,226,033 B2 | 6/2007 | Foucher | |
| D569,713 S | 5/2008 | Sandidge | |
| D576,475 S | 9/2008 | Didehvar | |
| 7,466,286 B2 | 12/2008 | Chapman | |
| 7,712,260 B2 | 5/2010 | Vardaro | |
| 7,797,901 B2 * | 9/2010 | Near | E04B 2/7433 52/238.1 |
| 7,926,430 B2 | 4/2011 | Bakker | |
| 7,958,683 B2 | 6/2011 | Abusada | |
| 8,015,767 B2 * | 9/2011 | Glick | E04B 2/7425 52/220.7 |
| 8,033,059 B2 | 10/2011 | Contois | |
| 8,046,957 B2 | 11/2011 | Towersey | |
| D696,572 S | 12/2013 | Petruccelli | |
| 8,601,749 B2 | 12/2013 | Huene | |
| 8,613,168 B2 | 12/2013 | Huene | |
| 8,615,936 B2 | 12/2013 | Huene | |
| D699,547 S | 2/2014 | Syed et al. | |
| 8,813,455 B2 | 8/2014 | Merrifield | |
| 8,899,519 B2 | 12/2014 | Smith | |
| 2001/0009218 A1 | 7/2001 | Emaus | |
| 2003/0154672 A1 | 8/2003 | Spransy | |
| 2004/0226259 A1 | 11/2004 | Barnet | |
| 2006/0057345 A1 | 3/2006 | Surace | |
| 2006/0059806 A1 | 3/2006 | Gosling | |
| 2006/0157297 A1 * | 7/2006 | D'Antonio | E04B 9/001 181/287 |
| 2007/0186493 A1 * | 8/2007 | Baig | B28B 11/12 52/144 |
| 2008/0302054 A1 | 12/2008 | Gosling | |
| 2011/0100749 A1 * | 5/2011 | Nonogi | B32B 3/266 181/291 |
| 2011/0146180 A1 | 6/2011 | Klein | |
| 2011/0147119 A1 * | 6/2011 | Cao | B32B 37/1284 181/292 |
| 2013/0118831 A1 * | 5/2013 | Kawai | G10K 11/168 181/290 |
| 2014/0157720 A1 | 6/2014 | Huene | |

FOREIGN PATENT DOCUMENTS

| | | | |
|---|---|---|---|
| JP | 02164984 | 6/1990 | |
| JP | 0925621 | 9/1997 | |
| JP | 11013176 | 1/1999 | |
| JP | 11050574 | 2/1999 | |
| JP | 2003172041 | 6/2003 | |
| KR | 20020037255 | 5/2002 | |
| KR | 1020020037255 | 5/2002 | |
| KR | 101143844 | 5/2012 | |
| WO | WO 2012/008225 A1 * | 1/2012 | .......... G10K 11/168 |
| WO | 2012094766 | 7/2012 | |

OTHER PUBLICATIONS

Office Action for U.S. Appl. No. 14/114,019 mailed Aug. 7, 2015.
International Search Report and Written Opinion for PCT/US2013/063488 mailed Jan. 17, 2014.
Office Action for U.S. Appl. No. 29/473,239 mailed May 5, 2015.

(56) References Cited

OTHER PUBLICATIONS

Non-Final Office Action for U.S. Appl. No. 14/113,252 mailed on Nov. 9, 2015.
Non-Final Office Action for U.S. Appl. No. 14/114,501 mailed on May 25, 2016.
International Search Report and Written Opinion for Application No. EP 13843993 mailed May 30, 2016.
International Search Report and Written Opinion for Application No. EP 13844034 mailed on Jun. 7, 2016.
European Search Report for U.S. Appl. No. 13/844,034 mailed on Sep. 7, 2016.
European Search Report for U.S. Appl. No. 13/843,375 mailed on Sep. 9, 2016.

* cited by examiner

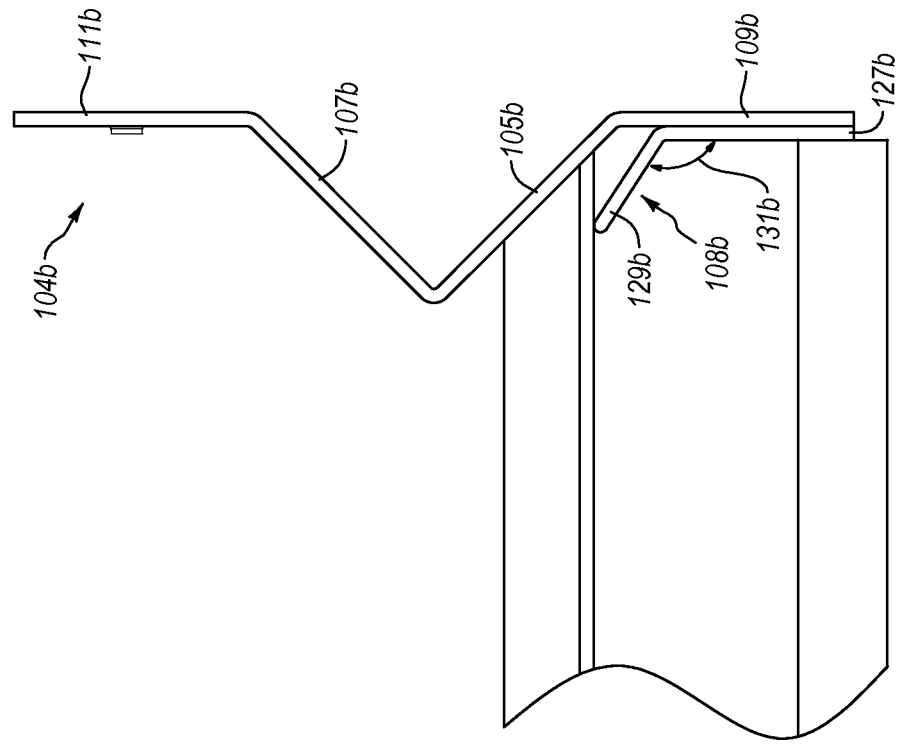
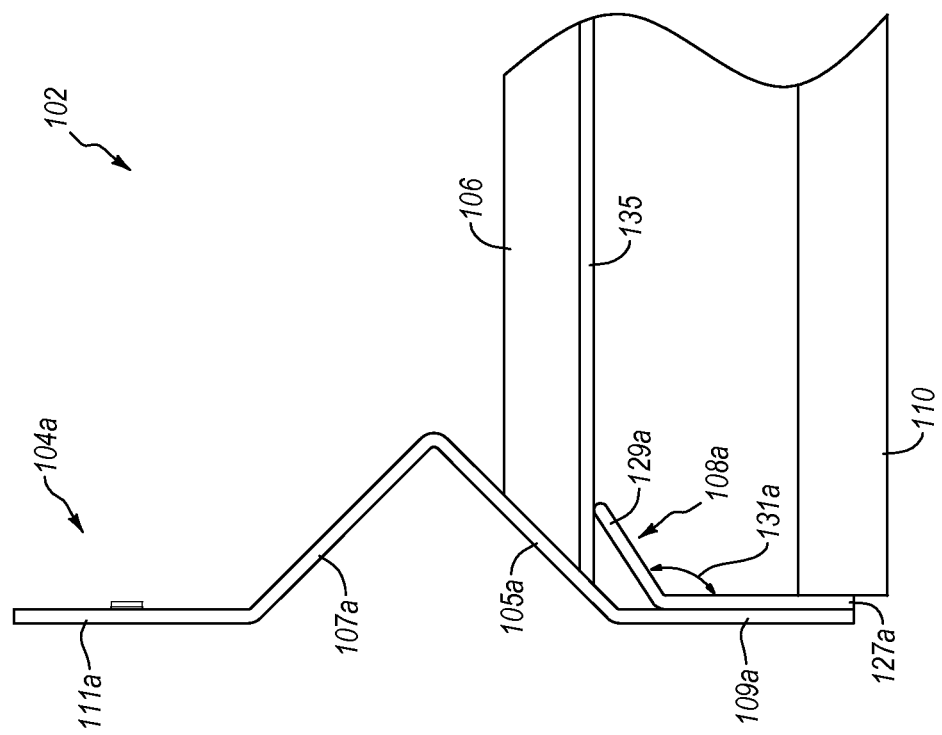
FIG. 3

PERFORATED ACOUSTIC TILES

CROSS-REFERENCE TO RELATED APPLICATIONS

This application is a continuation in part application of U.S. patent application Ser. No. 14/113,252, titled Center-Mounted Acoustical Substrates, and filed Oct. 22, 2013, which is a 35 U.S.C. §371 United States National Stage of PCT Application No. PCT/US2013/063488, titled "Center-Mounted Acoustical Substrates," filed Oct. 4, 2013, which claims priority to and the benefit of U.S. Provisional Patent Application Ser. No. 61/710,592, filed 5 Oct. 2012. The entire content of each of the aforementioned patent applications is incorporated herein by reference.

BACKGROUND

1. Technical Field

This disclosure relates to systems, methods, and apparatus for modular wall construction and design.

2. Background and Relevant Art

Environments that incorporate modular walls often sacrifice sound and other acoustical issues for ease of assembly, reconfiguration, and aesthetics. One reason for this is that modular walls often do not span full floor-to-ceiling distances or otherwise close gaps between walls. In other cases, the types of walls suitable for modular construction are typically thinner walls, and in some cases much less dense than permanent walls. These thinner, less dense walls tend to be less effective at blocking sound.

Although modular walls can be assembled with acoustical advantages, walls pre-assembled with acoustic panels can be cumbersome, and in some cases, too heavy for installation. Specifically, many jurisdictions may place certain limits on the weight a worker can lift.

BRIEF SUMMARY

Implementations of the present disclosure comprise systems, methods, and apparatus that enable construction of modular walls on-site with advanced acoustical properties. The constructed walls are simple to assemble, but yet are also structurally sound, even for environments susceptible to earthquake damage.

In at least one implementation, one or more acoustic tiles may be used in a modular wall system to provide the modular wall system with desired acoustic properties. The one or more acoustic tiles may include a substrate layer and a veneer layer. The substrate layer may have a plurality of holes extending at least partially through the substrate layer. The veneer layer may have a plurality of micro-perforations (or microholes) extending at least partially through the veneer layer. The veneer layer may be attached to the substrate layer to form the acoustic tile. The acoustic tile formed by the substrate layer and the veneer layer may be attached to a frame of a modular wall system either on an interior or a facing surface of the frame. The acoustic tile formed by the substrate layer and the veneer layer may provide certain desired acoustic properties to the modular wall system, such as noise reduction.

In another implementation, a modular wall system includes a frame having at least one vertical bracket. One or more connection members are associated with the frame. An acoustic tile may be connected to the frame by the one or more connection members. The acoustic tile may include a substrate layer that has a plurality of holes extending at least partially therethrough. The acoustic tile may also include a veneer layer that has a plurality of micro-perforations. The veneer layer may be attached to the substrate layer. The resulting acoustic tile may be attached to the frame and may provide the modular wall system with desired acoustic properties, such as noise reduction.

According to another implementation, a method for making an acoustic tile for a modular wall system includes forming holes at least partially through a substrate layer. The method also includes forming microholes at least partially through a veneer layer. Additionally, the method also includes applying the veneer layer over the substrate layer so that the veneer layer covers the holes and thereby provides the acoustic tile with desired acoustic properties.

Additional features and advantages of illustrative and/or exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such illustrative and/or exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments and/or implementations thereof which are illustrated in the appended drawings. Understanding that these drawings depict only typical embodiments and/or implementations of the invention and are not therefore to be considered to be limiting of its scope, the invention will be described and explained with additional specificity and detail through the use of the accompanying drawings in which:

FIG. 3 illustrates a top cross-sectional hybrid compilation view of certain features of the acoustic wall module shown in FIG. 1;

DETAILED DESCRIPTION

Implementations of the present disclosure comprise systems, methods, and apparatus that enable construction of modular walls on-site with advanced acoustical properties. The constructed walls are simple to assemble, but yet are also structurally sound, even for environments susceptible to earthquake damage.

Figure 1:
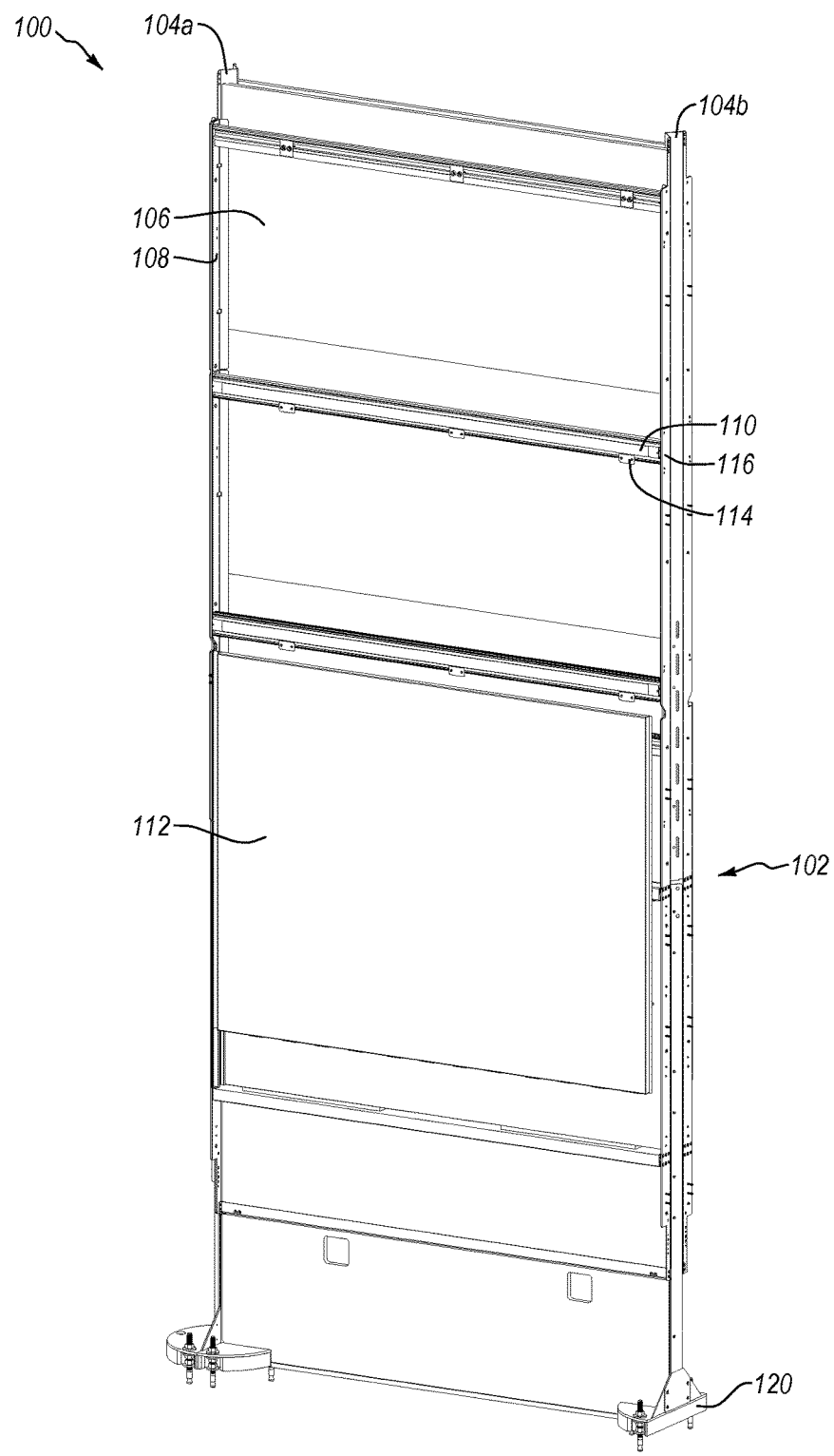
FIG. 1 illustrates a perspective view of a partially assembled acoustic wall module in accordance with an implementation of the present invention.

FIG. 1 illustrates an acoustic wall module 100 including a frame 102 according to an implementation of the present invention. In particular, FIG. 1 illustrates one or more sides of a wall module 100 during installation. One will appreciate that the opposing side (not shown) can comprise essentially the same components, but need not be identical in construction (e.g., number of frame and/or wall elements) on both opposing sides of wall module 100. As illustrated, frame 102 includes opposing first and second vertical brackets 104a, 104b, and is configured to receive the plurality of wall elements illustrated. One will appreciate, however, that the present disclosure is not limited to a frame including two vertical brackets. For instance, a frame according to certain implementations may include a single vertical bracket or more than two vertical brackets depending on the specific structural and/or aesthetic needs of the user.

In certain implementations, frame 102 and/or vertical brackets 104a, 104b may be formed of or otherwise comprise metal or a metal alloy. In other implementations, however, frame 102 and/or vertical brackets 104a, 104b may be formed of or otherwise comprise any suitable material, known in the art or otherwise, which can be used to construct, build, or assemble such wall modules.

Frame 102 may also include a base elements 120 configured to support frame 102 in a substantially vertical position. In other implementations, however, base element 120 may be configured to support the frame 102 in any suitable orientation, direction, and/or position, including substantially horizontal or diagonal. As illustrated, base element 120 is attached to frame 102 at the bottom of each vertical bracket 104a, 104b, and is configured for attachment to a floor or subfloor member (not shown). In other implementations, however, base element 102 may be attached to any portion of frame 102 and/or wall module 100. Base element 102 may also be configured for attachment to a ceiling, wall, pillar, divide, or any other suitable structure, or may be configured to stand alone without attachment to other structural element(s). Furthermore, base element 120 may include a single base element, or a plurality of base elements or subunits as illustrated.

Acoustic wall module 100 may further include a plurality of wall elements, including at least one substrate or acoustic substrate 106. In certain implementations, acoustic substrate 106 may include a single sheet of fabricated medium-density fiberboard (MDF). One will appreciate, however, that the present disclosure is not so limited. For example, acoustic substrate 106 may include a plurality of substrate units that are assembled together into an acoustic substrate or a plurality of acoustic substrates 106. Acoustic substrate 106 may also include and/or be formed of any material suitable for construction, fabrication, and/or installation of a modular wall according to implementations of the present invention.

In certain implementations, acoustic substrate 106 may be configured to inhibit sound from passing therethrough. For instance, an acoustic substrate 106 according to at least one implementation may include and/or be formed of a material capable of substantially inhibiting sound and/or sound waves of a certain volume, decibel, wavelength, and/or magnitude (or range thereof) from passing therethrough. In such an implementation, the acoustic wall module 100 may function as a sound barrier and may provide an element of privacy to individuals on opposing sides of the acoustic substrate 106 and/or wall module 100. In some implementations, acoustic substrate 106 may also be configured such that it can be carried, installed, and or removed by a single person or a plurality of persons.

An acoustic substrate 106 according to certain implementations may be fabricated as a sheet, tile, board, or other elongated and substantially flat material. In other implementations, acoustic substrate 106 may include rounded, angled, circular, or other shape or a plurality thereof. Furthermore, substrate 106 may be fabricated in a variety of gauges or other measure of thickness. For instance, a substrate 106 according to some implementations may include one or more materials configured into a sheet or tile having a gauge of at least about 0.25 inches, at least about 0.5 inches, at least about 0.75 inches, at least about 1.0 inches, at least about 1.25 inches, and so forth. Other implementations may include a substrate 106 having a gauge of less than about 0.25 inches or a gauge greater than about 1.25 inches. At least one implementation includes a plurality of substrates 106, each having a suitable gauge or thickness for an intended purpose.

In at least one implementation, the plurality of wall elements further includes at least one substrate retaining member 108 configured to at least partially secure acoustic substrate 106 to the frame 102. As illustrated, substrate retaining member 108 may include at least one elongated bar, strip, column, or other element configured for attachment to at least one vertical bracket 104a. In certain implementations, however, substrate retaining member 108 may include a clip, plate, bracket, screw, bolt, tie, adhesive, fastener, or any other material suitable for securing an acoustic substrate 106 to the frame 102. Furthermore, a plurality of substrate retaining members 108 configured to at least partially secure one or more acoustic substrates 106 to one or more frames 102 and/or one or more vertical brackets 104a, 104b is also contemplated herein.

In some implementations, at least one exterior wall element 112 is also provided. In certain implementations, exterior wall element 112 is configured to substantially conceal from view at least a portion of frame 102, vertical brackets 104a, 104b, and/or plurality of wall elements (e.g., acoustic substrate 106), from a first vantage point. An exterior wall element 112 may include a single sheet, tile, board configured to cover a defined area. However, exterior wall element 112 may also or alternatively include a plurality of subunits that are assembled together into an exterior wall element or other wall exterior. A plurality of exterior wall elements 112 is also contemplated herein. Furthermore, exterior wall element 112 may include and/or be formed of any material suitable for construction, fabrication, and/or installation on a modular wall according to implementations of the present invention.

In certain implementations, exterior wall element 112 may include an aesthetic display or appearance. For example, exterior wall element 112 may include an outer surface that provides structural and/or aesthetic appeal suitable for a residential, commercial, industrial, governmental, educational, and/or other building or environment. Furthermore, the outer surface of exterior wall element 112 may function as an outer or exterior surface of a wall, divide, barrier, or other architectural and/or decorative structural element. Exterior wall element 112 may also or alternatively function as a ceiling, floor, subfloor, or any other architectural and/or decorative structural element.

In at least one implementation, the plurality of wall elements further includes at least one horizontal support member 110. In some implementations, horizontal support member 110 is configured to at least partially secure the exterior wall element 112 to the frame 102. As illustrated, horizontal support member 110 may include at least one elongated bar, strip, column, or other element configured for attachment to at least one of vertical brackets 104a, 104b and/or substrate retaining member 108. In certain implementations, however, horizontal support member 110 may include a clip, plate, bracket, screw, bolt, tie, adhesive, fastener, or any other material suitable for securing an exterior wall element 112 to the frame 102. Furthermore, a plurality of horizontal support members 110 configured to at least partially secure one or more exterior wall elements 112 to one or more frames 102 and/or one or more vertical brackets 104 is also contemplated herein.

In one or more implementations, horizontal support member 110 is attached to frame 102, and exterior wall element 112 is attached to horizontal support member 110 so as to substantially conceal from view at least a portion of frame 102, vertical brackets 104a, 104b, and/or one or more of the plurality of wall elements (including acoustic substrate 106, substrate retaining member 108, and/or horizontal support member 110) from at least a first vantage point. Exterior wall element 112 may be attached to horizontal support member 110 via an attachment member 114.

One will appreciate, however, that the present disclosure is not so limited. For instance, horizontal support member 110 may also or alternatively be attached to vertical brackets 104a, 104b and/or substrate retaining member 108, and exterior wall element 112 may also or alternatively be attached to frame 102, vertical brackets 104a, 104b, and/or substrate retaining member 108. Furthermore, exterior wall element 112 may be attached to horizontal support member 110 directly, through an attachment mechanism involving slotted and/or interlocking attachment members, frictional and/or gravitational forces, or any other suitable mechanism of direct attachment. Exterior wall element 112 may also or alternatively be attached to horizontal support member 110 indirectly via at least one clip, plate, bracket, screw, bolt, tie, adhesive, fastener, or any other material suitable for securing and/or attaching an exterior wall element 112 to a horizontal support member 110.

According to some implementations, one or more horizontal support members 110 may be coordinated by first and second substrate retaining members 108 such that the respective first ends of the one or more horizontal support members 110 are attached to the first substrate retaining member 108 and the respective second ends of the plurality of horizontal support members 110 are attached to the second substrate retaining member (not shown). For example, the first and second substrate retaining members 108 and the coordinated plurality of horizontal support members 110 may comprise or form a ladder or ladder frame (see e.g. ladder or ladder frame 880, FIG. 8). Furthermore, the ladder frame may be directly and/or indirectly attached to the frame by means of the first and second substrate retaining members. One will appreciate, however, that the disclosure is not so limited, and that direct attachment of one or more components is also contemplated herein.

In an illustrative implementation, at least a first portion of the first substrate retaining member 108 abuts and/or attaches directly to the first vertical bracket 104a, and at least a first portion of the second substrate retaining member (not shown) abuts and/or attaches directly to the second vertical bracket 104b. The present disclosure, however, is not limited to direct attachment and/or abutment of components. Furthermore, the acoustic substrate 106 may be positioned between the vertical bracket 104a, 104b and at least respective second portions of the substrate retaining members 108, such that the ladder or ladder frame secures the acoustic substrate 106 to the frame 102. In certain implementations, the acoustic substrate 106 is at least partially secured to the frame 102 through one or more of (a) a compressive force, (b) a frictional force, (c) an adhesive, and (d) a fastener. For example, acoustic substrate 106 may be at least partially secured to the frame 102 through a compressive force applied by the substrate retaining members 108 (optionally of the ladder or ladder frame) and by the vertical bracket 104a.

In some implementations, horizontal support member 110, whether considered alone or as part of a ladder or ladder frame, may be attached to frame 102, vertical brackets 104a, 104b, and/or substrate retaining member(s) 108 via one or more fasteners 116. Fastener 116 may include a bolt, screw, rivet, or other hardware configured to secured two elements together by passing into and/or through both elements. One will appreciate, however, that a fastener 116 according to the present disclosure is not so limited. For instance, a fastener 116 may also or alternatively include a clip, bracket, tie, adhesive, fastening member, or any other material suitable for securing and/or attaching a horizontal support member 110 to a frame 102. Furthermore, a fastener 116 may attach horizontal support member 110 to frame 102 by any suitable mechanism. Substrate retaining member 108 may also be attached to the frame 102 and/or vertical brackets 104a, 104b via a fastener 116.

In certain implementations, horizontal support member 110 comprises a first end and a second end. As illustrated, the first end of the horizontal support member 110 may be attached to the first vertical bracket 104a and the second end of the horizontal support member 110 may be attached to the second vertical bracket 104b. One will appreciate, however, that the present invention is not so limited and that horizontal support member 110 may be attached to frame 102 by or through any suitable mechanism. In at least one implementation, the first end of horizontal support member 110 is attached to a first substrate retaining member 108, and/or the second end of the horizontal support member 110 is attached to a second substrate retaining member (not shown).

Figure 2:
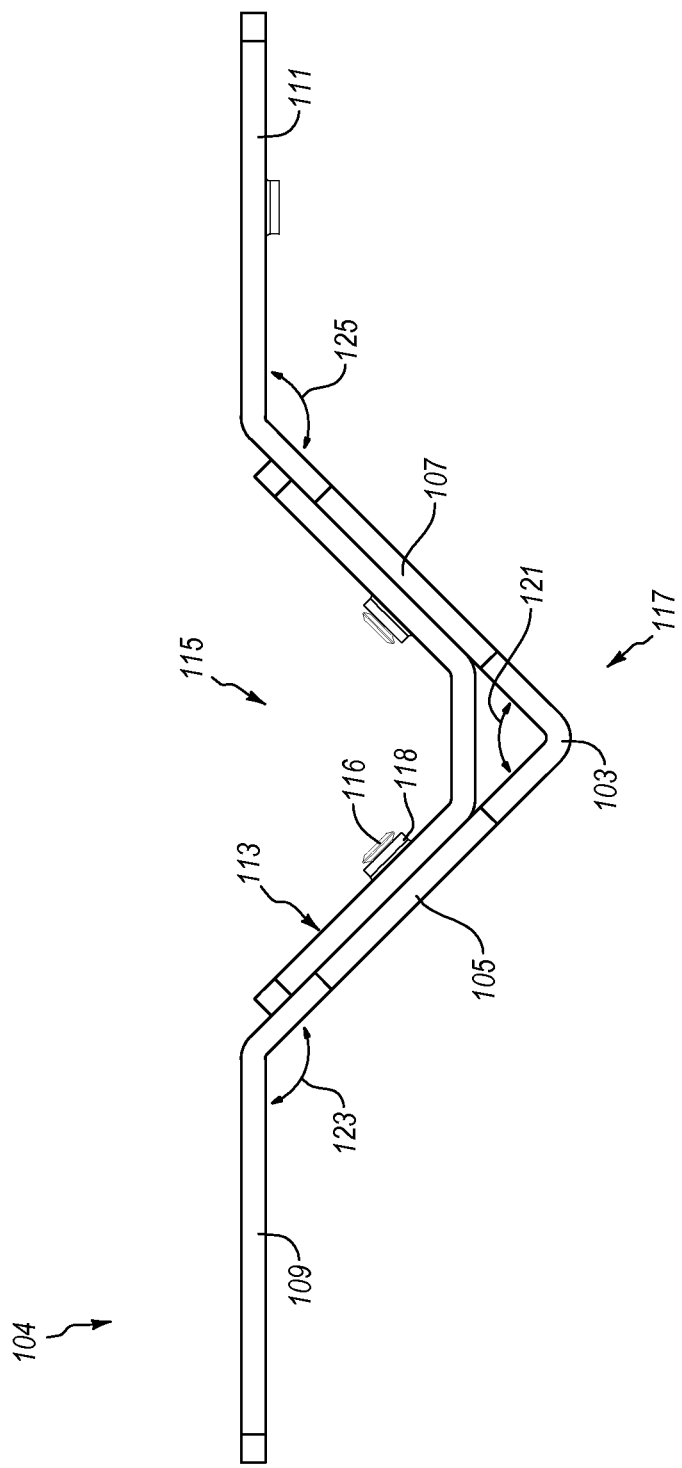
FIG. 2 illustrates a top cross-sectional view of a vertical bracket of the acoustic wall module shown in FIG. 1.

FIG. 2 illustrates a top, cross-sectional view of a vertical bracket 104 according to an implementation of the present invention. In at least one illustrative implementation, the vertical bracket 104 comprises an angled configuration providing a plurality of surfaces in a plurality of planes, and the plurality of surfaces may be configured for attachment of a plurality of frame and/or wall elements. Vertical bracket 104 may include, form, and/or otherwise be configured in a V-shape configuration, including a V-shaped element 103 that includes a first arm 105 and a second arm 107 arranged at an angle 121 such that the vertical bracket 104 includes a concave portion 115 and a convex portion 117. One will appreciate, however, that other configurations, including, flat, straight, rounded, and/or other various angled configurations, are also contemplated herein.

Vertical bracket 104 may also include a first extension element 109 extending from the first arm 105 at an angle 123 and in a first direction. Vertical bracket 104 may also include a second extension element 111 extending from the second arm 107 at an angle 125 and in a second direction such that the vertical bracket comprises, includes, forms, and/or is configured in a partially flattened M-shape configuration. In some implementations, the second direction in which the second extension element 111 extends is opposite the first direction in which the first extension element 109 extends and/or the first and second extension elements 109, 111 of the vertical bracket 104 are each configured for attachment of horizontal support members (not shown).

In an illustrative implementation, a bracket reinforcement member 113 may be attached to the concave portion 115 of the vertical bracket 104. The bracket reinforcement member 113 may be configured to support the first arm 105 and the second arm 107 and to prevent the angle 121 at which the first arm 105 and a second arm 107 are arranged from changing substantially in at least a first direction. One will appreciate, however, that bracket reinforcement member 113 may be configured and/or attached to support vertical bracket 104 in any suitable manner. For instance, bracket reinforcement member 113 may be attached to the convex portion 117, another portion, or a plurality of portions of the vertical bracket 104. In at least one implementation, bracket reinforcement member 113 is attached to the concave portion 115 of the vertical bracket 104 via at least one fastener 116 and via opening 118. One will appreciate, however, that use of fastener 116 and opening 118 are illustrative only, and that any suitable means of attachment is contemplated herein.

As illustrated in FIG. 3, an implementation may include one or more acoustic substrates 106 positioned between first and second vertical brackets 104a and 104b of frame 102. Illustratively, acoustic substrate 106 is at least partially secured to frame 102 and/or vertical brackets 104a, 104b through substrate retaining members 108a, 108b being attached to the frame 102 and/or vertical brackets 104a, 104b. For example, substrate retaining member 108a may secure acoustic substrate 106 to frame 102 by pinching and/or pressing a first end of acoustic substrate 106 against the first vertical bracket 104a. Likewise, substrate retaining member 108b may secure acoustic substrate 106 to frame 102 by pinching and/or pressing a second end of acoustic substrate 106 against the second vertical bracket 104b.

One will appreciate, however, that the present invention is not so limited. For instance, an acoustic substrate 106 may be secured to a frame 102 and/or a vertical bracket 104a, 104b via a fastener. Furthermore, an acoustic substrate 106 may be at least partially secured to a frame 102 and/or a vertical bracket 104 through a single substrate retaining member 108 or a plurality of substrate retaining members being attached to the frame 102 and/or one or more vertical brackets 104a, 104b. In one or more implementations, the acoustic substrate 106 may be positioned between at least one substrate retaining member 108a, 108b and at least one first arm 105a, 105b of one or more vertical brackets 104a, 104b of frame 102.

In certain implementations, the substrate retaining members 108a, 108b may have angled configurations, respectively. An illustrative substrate retaining member 108a, 108b may also include a plurality of arms configured at one or more angles. For instance, substrate retaining members 108a, 108b may include first arms 127a, 127b and second arm 129a, 129b, arranged at angles 131a, 131b, respectively. In at least one implementation, angle 131a is substantially similar to angle 131b. In other implementations, however, angle 131a may be a different angle than angle 131b. Furthermore, angles 131a, 131b may be about 90 degrees, greater than 90 degrees, or less than 90 degrees. In other implementations, however, substrate retaining members 108a, 108b may have straight, rounded, blocked, symmetrical or other configurations without departing from the scope of this disclosure.

Illustratively, at least the first arms 127a, 127b of substrate retaining members 108a, 108b may include first and second opposing surfaces. The first surfaces may be attached to the horizontal support member 110 and the second surfaces may be attached directly to the first extension elements 109a, 109b of the vertical brackets 104a, 104b such that at least respective portions of the first arms 127a, 127b of the substrate retaining members 108a, 108b are positioned between the horizontal support member 110 and at least respective portions of vertical brackets 104a, 104b. One will appreciate, however, that other configurations, including attachment to other parts, portions, elements, and/or members are contemplated herein. For example, horizontal support member 110 may be attached directly or indirectly to vertical brackets 104a, 104b and/or first extension elements 109a, 109b. Similarly, substrate retaining members 108a, 108b may be attached to various surfaces and/or parts of the frame 102, the vertical brackets 104a, 104b, and/or the plurality of wall elements without departing from the scope of this disclosure.

In one or more implementations, at least part of the acoustic substrate 106 may be positioned between at least respective portions of the second arms 129a, 129b of the substrate retaining members 108a, 108b and the first arms 105a, 105b of the vertical brackets 104a, 104b such that the acoustic substrate 106 is pressed against at least a part of the convex portions 117 (see FIG. 2) of vertical brackets 104a, 104b. Acoustic substrate 106 may be held and/or secured against vertical brackets 104a, 104b by a force exerted by at least part of substrate retaining members 108a, 108b. For instance, second arms 129a, 129b of the substrate retaining members 108a, 108b may apply a force to acoustic substrate 106 in a first direction such that acoustic substrate 106 is held and/or secured to vertical brackets 104a, 104b. One will appreciate, however, that other configuration, including attachment to other parts, portions, elements, and/or members are contemplated herein. For example, acoustic substrate 106 may be positioned against and/or attached to the first extension elements 109a, 109b or the concave portions 115 (see FIG. 2) of the vertical brackets 104a, 104b, or other part(s) of the frame 102 without departing from the scope of this disclosure.

In at least one implementation, substrate retaining members 108a, 108b may include or otherwise be formed of a substantially rigid material, such as metal or metal alloy, illustratively. In other implementations, however, substrate retaining members 108a, 108b may include or otherwise be formed of a material possessing at least one flexible property. In certain implementations, substrate retaining members 108a, 108b may exhibit flexibility within a defined range of angles 131a, 131b, and substantial rigidity beyond the defined range. Properties related to material flex and/or flexibility are known in the art and contemplated herein. Furthermore, other angles and the like disclosed herein may include similar properties related to rigidity and/or flexibility as discussed herein.

In some implementations, acoustic substrate 106 may include one or more chamfered ends and/or edges. For instance, acoustic substrate 106 may include one or more chamfered end surfaces that corresponds in angle to the orientation and/or angle of first arms 105a, 105b of the vertical brackets 104a, 104b such that the one or more chamfered end surfaces are complimentary to the portion of the one or more vertical brackets 104a, 104b with which it intersects. Thus, acoustic substrate 106 may be configured for attachment to one or more vertical brackets 104a, 104b such that at least a first end or end surface of acoustic substrate 106 mates with at least a portion of one or more vertical brackets 104a, 104b with substantially similarity and/or congruity.

According to certain implementations, the acoustic substrate 106 is at least partially secured to first surfaces of the vertical brackets 104a, 104b and the horizontal support member 110 is attached to a second surface of the vertical brackets 104a, 104b. Thus, horizontal support member 110 may be attached to the first extension elements 109a, 109b, and may be attached to the substrate retaining members 108a, 108b such that the substrate retaining members 108a, 108b are respectively positioned between at least a portion of the horizontal support member 110 and vertical brackets 104a, 104b. One will appreciate, however, that the present disclosure is not so limited and that other configurations of various components of the wall module are contemplated herein.

In at least one implementation, acoustic substrate 106 is at least partially covered by an outer element 135. Thus, an outer element 135 according to certain implementations may cover at least a portion of one or more surfaces of acoustic substrate 106. Outer element 135 may include a vinyl layer configured to at least partially protect acoustic substrate 106 from damage caused by the impact, pressure, or contact of the second arms 129a, 129b of substrate retaining members 108a, 108b against acoustic substrate 106. An outer element 135 may also or alternatively serve other functions, protective or otherwise, without departing from the scope of this disclosure. An outer element 135 may also cover at least a portion of other surfaces of other elements disclosed herein.

Figure 4:
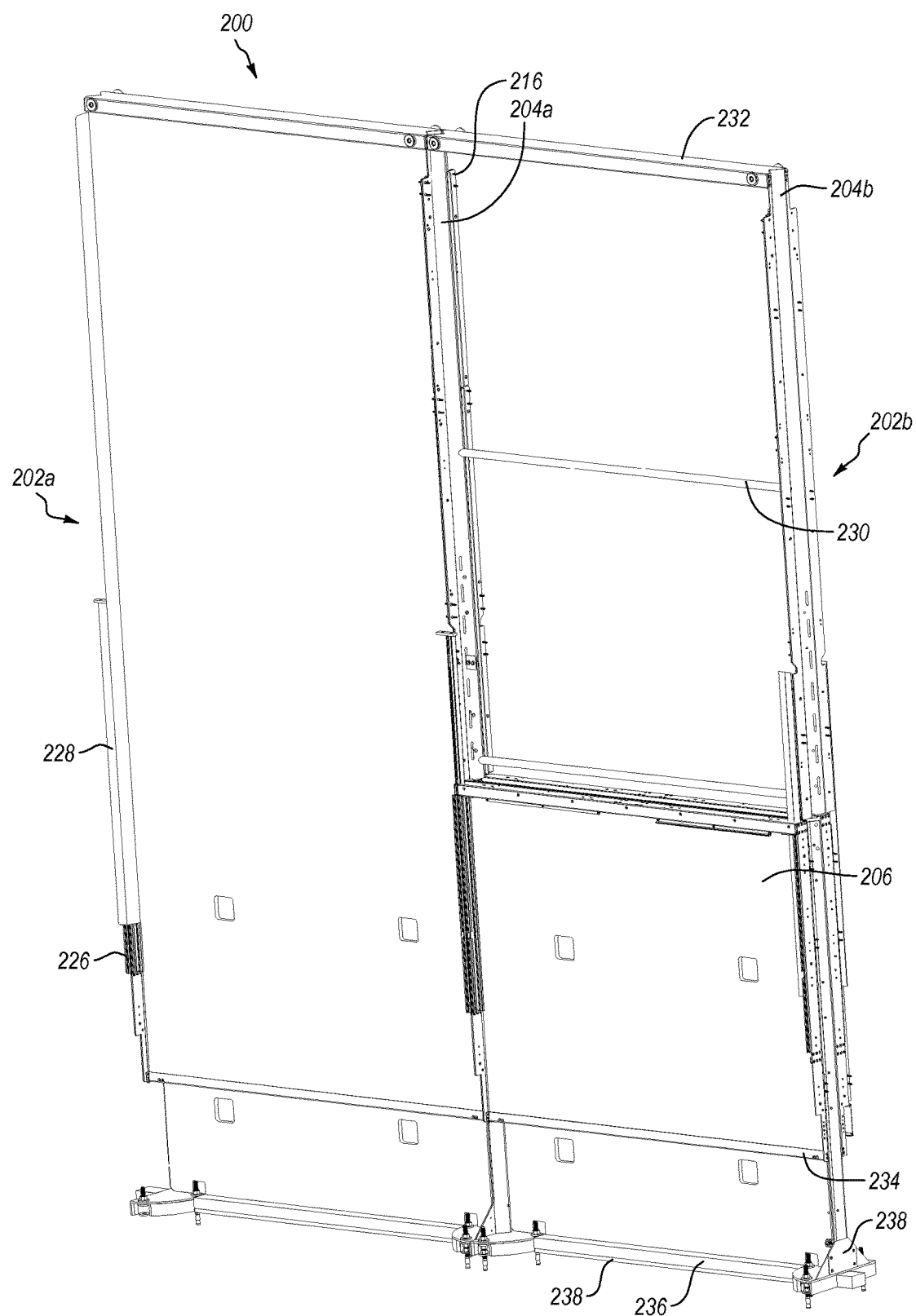
FIG. 4 illustrates a perspective view of a partially assembled modular acoustic wall in accordance with an implementation of the present invention.

FIG. 4 illustrates a partially assembled modular acoustic wall 200 in which a first frame or wall module 202a has been attached to a second frame or wall module 202b with one or more fasteners 216. As illustrated, frames 202a and 202b are aligned at a 180 degree angle such that frame 202b constitutes an extension of frame 202a. One will appreciate, however, that frames 202a and 202b may be positioned at other angles without departing from the scope of this disclosure.

In certain implementations, frame 202b of modular wall 200 may include a first vertical bracket 204a and a second vertical bracket 204b separated by a distance. In other implementations, however, frame 202b may include a single vertical bracket or more than two vertical brackets. In at least one implementation, frames 202a and 202b share at least one common vertical bracket. Frame 202b may also include at least one structural support member 230 positioned between first vertical bracket 204a and second vertical bracket 204b. Structural support member 230 may be configured to prevent frame 202b and/or vertical brackets 204a, 204b from moving substantially in one or more directions. In at least one implementation, structural support member 230 may include a torsion bar, a rod, a beam, or any other structural element configured to support the frame 202b.

According to some implementations, modular wall 200 may include one or more acoustic substrates 206 secured to the frames 202a, 202b. Furthermore, modular wall 200 may include an upper support element 232 and/or a lower support element 234 configured to at least partially secure frame 202b and/or vertical brackets 204a and 204b in a predetermined or other configuration. Thus, a frame 202b according to some implementations may include a plurality of vertical brackets separated by a plurality of support elements configured to secure the vertical brackets into a frame-like structure. One will appreciate, however, that the present disclosure is not so limited and that other configurations are contemplated herein.

In one or more implementations, modular wall 200 may also include one or more spacer elements 228 configured to provide a buffer, pad, or cushion between elements of the modular wall 200. Modular wall 200 may also include one or more column members 226 configured for attachment to various structural and/or aesthetic elements of the modular wall 200. Modular wall 200 may also include one or more insulation members 236 and/or sealing members 238 configured to provide an appropriate degree of separation, divide, and/or insulation for or between elements disclosed herein.

Figure 5:
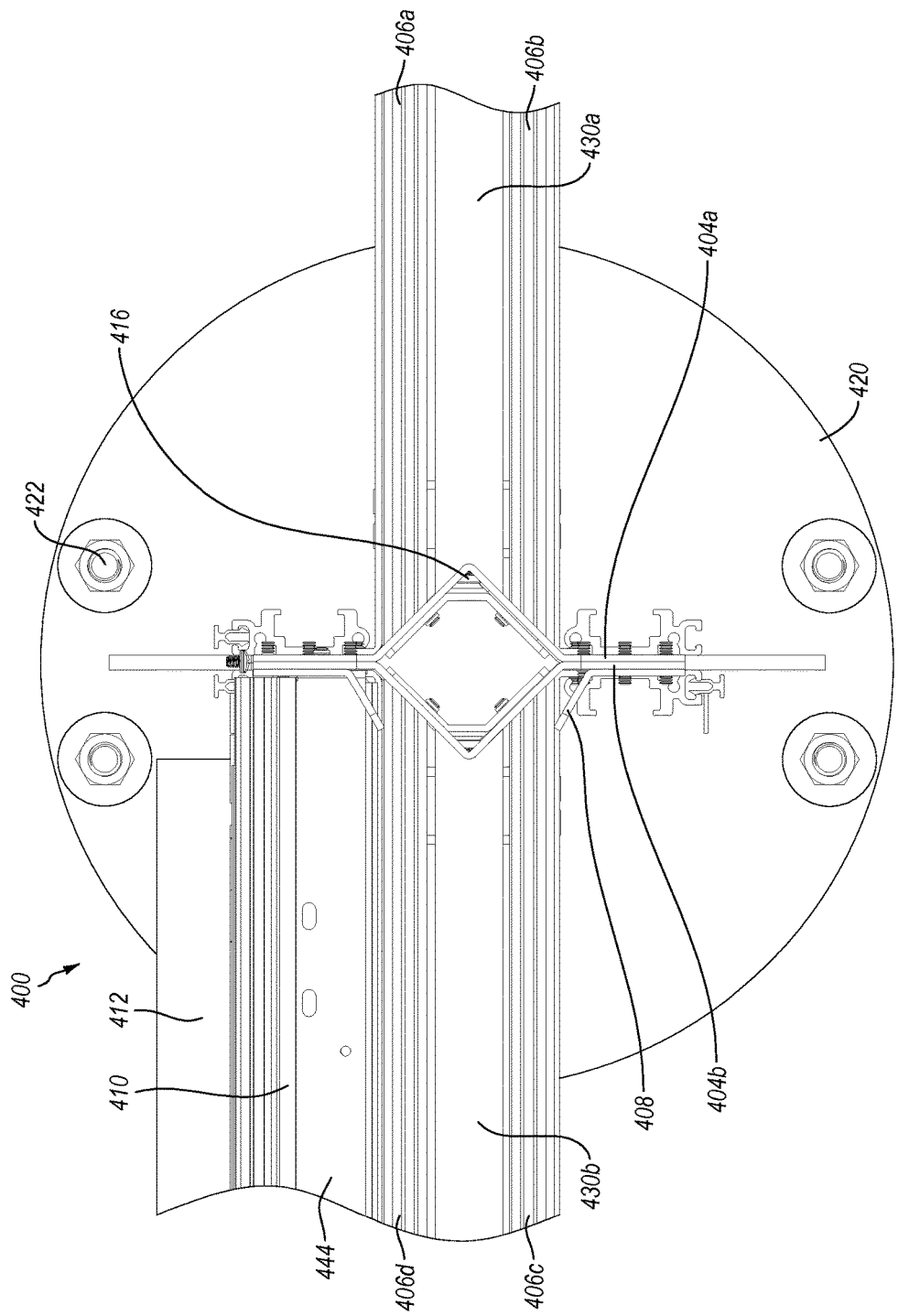
FIG. 5 illustrates a top cross-sectional view of certain features of the modular acoustic wall shown in FIG. 4.

FIG. 5 illustrates a top partial cross-sectional view of a modular wall 400 according to certain implementations of the present invention. Modular wall 400 may include at least a first vertical bracket 404a attached to a second vertical bracket 404b. Each vertical bracket 404a, 404b may have attached thereto a plurality of wall elements. As illustrated, structural support member 430a may be attached to a convex portion of vertical bracket 404a via fastener 416, and may extend away from vertical bracket 404a in a first direction. Similarly, structural support member 430b may be attached to a convex portion of vertical bracket 404b via a fastener, and may extend away from vertical bracket 404b in a second direction. In certain implementations, the first direction is opposite the second direction.

Modular wall 400 may also include one or more acoustic substrates secured to one or more of vertical bracket 404a and 404b. As illustrated, acoustic substrate 406a may be secured against a first surface of vertical bracket 404a similar to first arm 105a, 105b illustrated in FIG. 3. For instance, acoustic substrate 406a may be secured against a convex portion of vertical bracket 404a. Similarly, acoustic substrate 406b may be secured against a second surface of vertical bracket 404a similar to second arm 107a, 107b illustrated in FIG. 3. For instance, acoustic substrate 406b may be secured against a convex portion of vertical bracket 404a. In at least one implementation, acoustic substrates 406a and 406b are positioned on opposing sides of the V-shaped element of vertical bracket 404a and on opposing sides of the structural support member 430a. Likewise, acoustic substrate 406c may be secured against a first surface of vertical bracket 404b and acoustic substrate 406d may be secured against a second surface of vertical bracket 404b such that acoustic substrates 406c and 406d are positioned on opposing sides of structural support member 430b. One will appreciate, however, that such a configuration is illustrative only and that one or more acoustic substrates may be arranged, attached, and or secured to any suitable surface of any suitable element disclosed herein.

Modular wall 400 may also include at least one substrate retaining member 408 configured to secure one or more acoustic substrates 406 to one or more vertical brackets 404. In at least one implementation, each acoustic substrate 406a, 406b, 406c, 406d is secured to a corresponding vertical bracket 404a, 404b by at least one substrate retaining member 408. Furthermore, one or more substrate retaining members 408 may be attached to an extension element of vertical brackets 404a, 404b, similar to extension element 109a, 109b illustrated in FIG. 3. In at least one implementation, each substrate retaining member 408 may be attached to a corresponding extension element of a vertical bracket 404a, 404b, similar to extension elements 109a, 109b, 111a, 111b illustrated in FIG. 3. One will appreciate, however, that other configurations, including attachment, arrangement, or other forms of securing various elements are contemplated herein. For instance, one or more substrate retaining members 408 may be attached to an arm or other element of a vertical bracket 404 or other frame or wall element without departing from the scope of this disclosure.

Modular wall 400 may further include at least one inner support member 444 and at least one horizontal support member 410 attached to a frame and/or to one or more vertical brackets 404. In certain implementations, inner support member 444 and/or horizontal support member 410 may be attached to a substrate retaining member 408. Furthermore, modular wall 400 may also include one or more exterior wall elements 412 configured to substantially conceal from view at least a portion of modular wall 400 from at least a first vantage point.

In at least one implementation, each respective extension element of each vertical bracket 404a, 404b, similar to extension elements 109a, 109b, 111a, 111b illustrated in FIG. 3, has attached thereto at least one substrate retaining member 408, at least one horizontal support member 410, at least one inner support member 444, and/or at least one exterior wall element 412. Such a modular wall 400 may be configured in complete or partial symmetry relative to opposing sides of the modular wall 400.

Modular wall 400 may further include at least one base element 420 configured to support modular wall 400 in a substantially vertical position. In some implementations, each vertical bracket 404a, 404b has attached thereto at least one base element 420. Furthermore, base element 420 may be secured to a floor via fastening member 422. One will appreciate, however, that other configurations as set forth herein and known in the art are contemplated.

Figure 6:
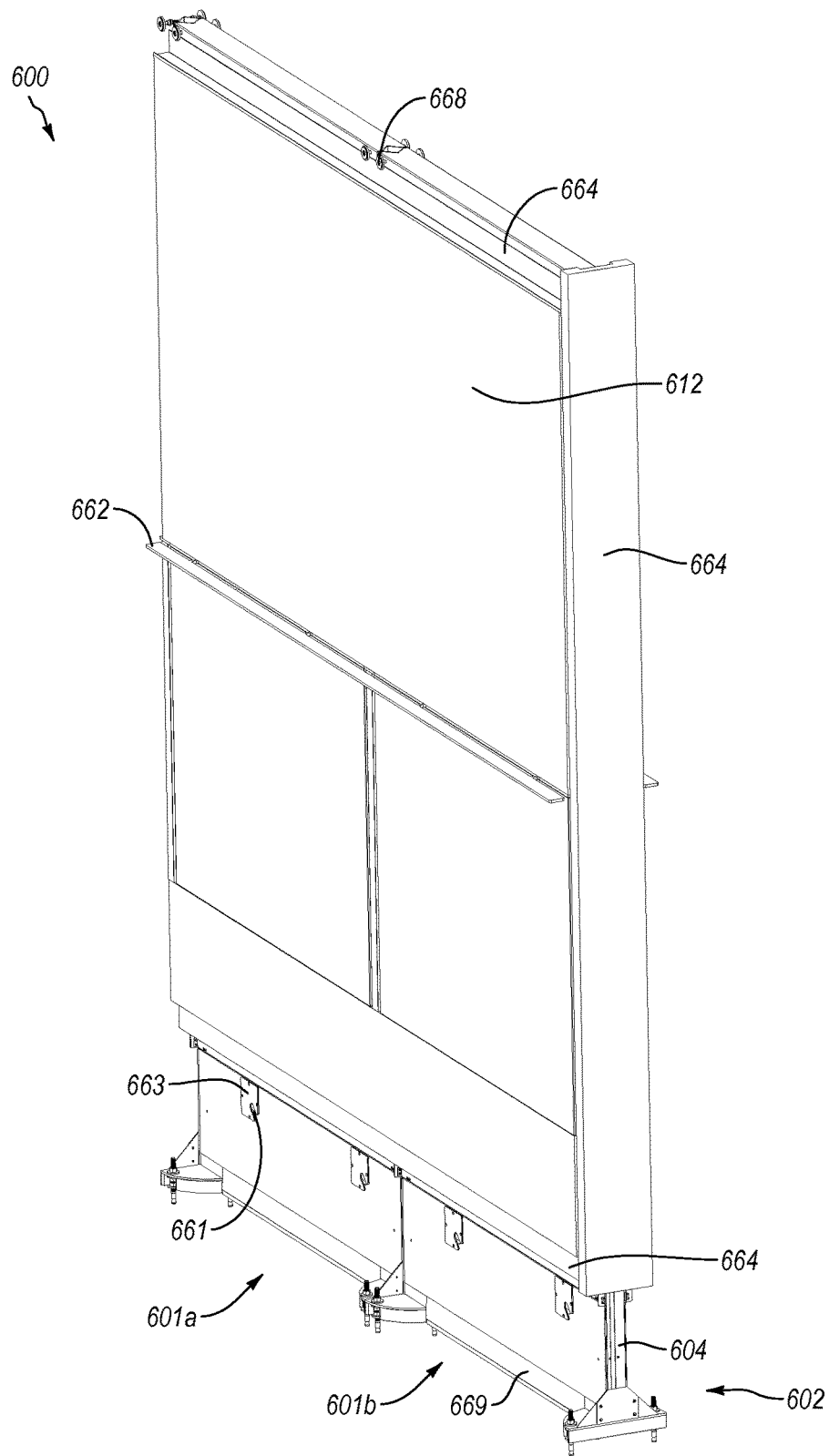
FIG. 6 illustrates a perspective view of a modular acoustic wall in accordance with an implementation of the present invention.

FIG. 6 illustrates a modular wall 600 according to an implementation of the present invention. Modular wall 600 may include a frame 602, including a plurality of vertical brackets 604 arranged in tandem and configured to support a plurality of wall elements. Modular wall 600 may also or alternatively include a plurality of frames or wall modules 601a, 601b connected and/or attached to one another. Modular wall 600 may further include one or more exterior wall elements 612 configured to substantially conceal from view at least a portion of modular wall 600 from at least a first vantage point.

In addition to features already disclosed herein, a modular wall 600 according to certain implementations may include one or more lighting elements 662 configured to provide a lighting effect to at least a portion of the modular wall. In certain illustrative implementations, lighting elements 662 may be secured to an exterior wall element 612 and/or another wall element(s). In other implementations, lighting elements 662 may be attached to the frame 602 and/or frame element(s).

Modular wall 600 may also include one or more trim elements 664 configured to provide an aesthetic or covering for the modular wall 600. In certain implementations, modular wall 600 may include a plurality of trim elements configured to cover one or more portions of the frame 602 and/or modular wall 600 that are not substantially concealed from view by an exterior wall element 612. For instance, a trim element 664 according to certain implementations may substantially conceal from view a portion of the modular wall 600, frame 602, frame element(s) and/or wall elements from one or more vantage points. In other implementations, trim elements 664 may be configured to prevent dust and debris from penetrating beyond the wall elements and into the inner, frame area of the modular wall 600.

Modular wall 600 may also include one or more openings 661, which may be at least partially covered by one or more covers 663. According to certain implementations, an opening 661 may provide a conduit through which cables, wires, pipes, rods, bars, or other matter may pass. Furthermore, an opening 661 may provide a receptacle to which an electrical or other outlet may be affixed. Cover 663 may be configured to at least partially seal opening 661 in the presence or absence of such a passing or affixed feature.

Modular wall 600 may further include one or more leveling elements 668 configured to adjust the orientation and/or interaction between elements of one or more modular walls 600. Modular wall 600 may also include one or more seals 669 configured to provide a protective barrier for at least a part of the modular wall 600.

Figure 7:
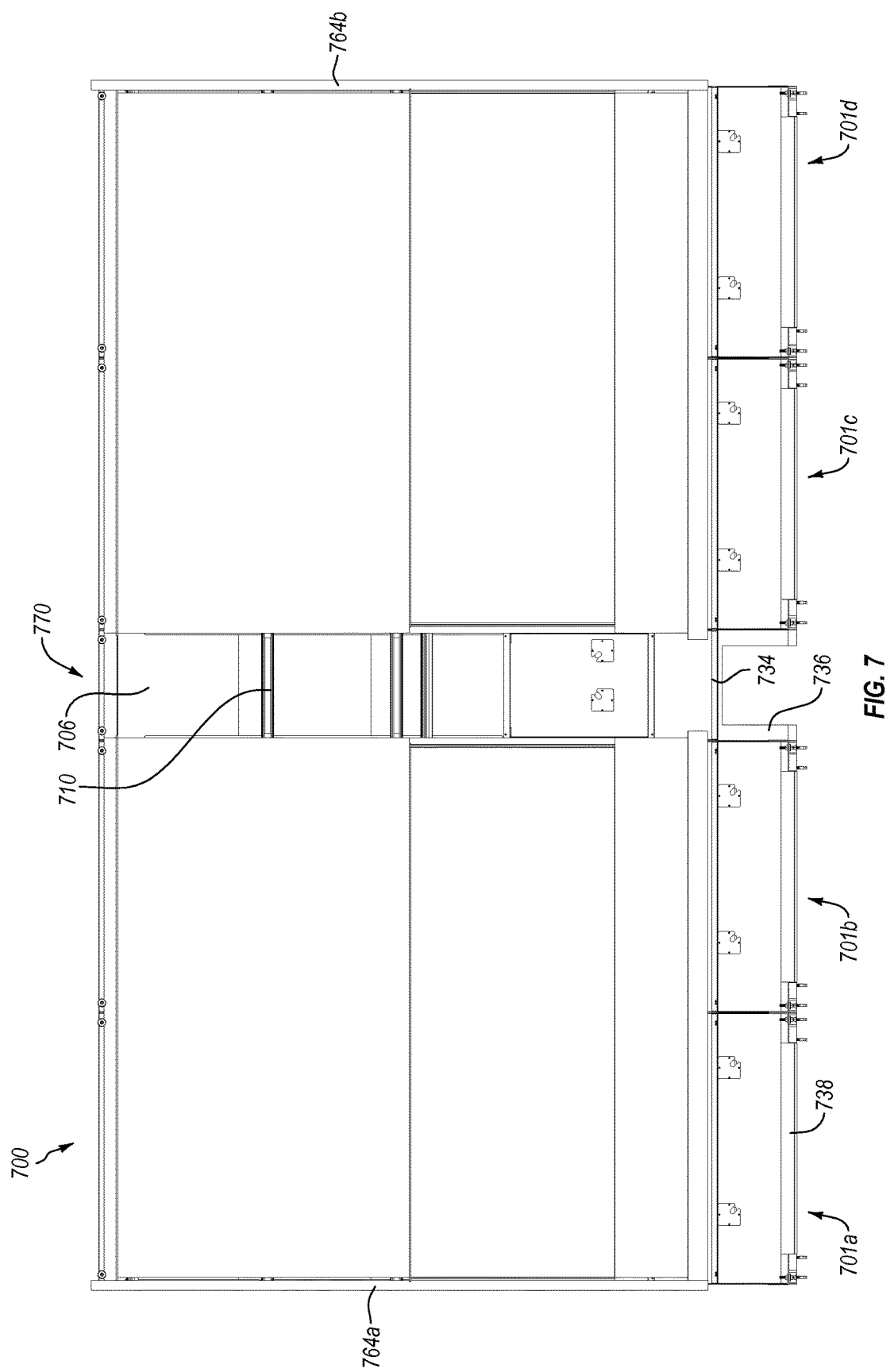
FIG. 7 illustrates a perspective view of a modular acoustic wall in accordance with another implementation of the present invention.

FIG. 7 illustrates a modular wall 700 according to an implementation of the present invention. Modular wall 700 may include a frame (not shown), including a plurality of vertical brackets (not shown) arranged in tandem and configured to support a plurality of wall elements. Modular wall 700 may also or alternatively include a plurality of wall modules 701a, 701b. 701c, 701d connected and/or attached to one another. Modular wall 600 may further include one or more exterior wall elements 712 configured to substantially conceal from view at least a portion of modular wall 700 from at least a first vantage point and one or more trim elements 764a, 764b configured to provide an aesthetic or covering for the modular wall 700.

In at least one implementation, modular wall 700 includes a transition region 770 characterized by an exposure of frame and/or internal wall elements. In an illustrative implementation, a plurality of exterior wall elements may cover a portion of modular wall 700 while leaving the transition region 700 uncovered. For instance, as illustrated, transition region 770 of modular wall 700 retains exposure of one or more acoustic substrates 706 and/or horizontal support members 710.

In at least one implementation, transition region 770 may serve as a point of intersection for a second and/or third modular wall (not shown). For instance, in certain implementations, a plurality of modular walls 700 may be arranged to provide separate rooms, areas, work spaces, and/or other divided regions. In an illustrative implementation, a second modular wall (not shown) may be attached to the front side of modular wall 700 so as to extend from the transition region 770 in a first direction. A third modular wall (not shown) may also or alternatively be attached to the rear side of modular wall 700 so as to extend from the transition region 770 in a second direction. Such second and/or third modular walls may intersect and/or extent from modular wall 700 at any suitable angle, including 90 degrees, greater than 90 degrees, or less than 90 degrees.

Modular wall 700 may also include one or more insulation members 736 and/or sealing members 738 configured to provide an appropriate degree of separation, divide, and/or insulation between elements disclosed herein. Modular wall 700 may also include one or more lower support elements 734 as discussed further herein in relation to lower support elements 234 of FIG. 4 and 834 of FIG. 8.

It is noted that a wall, wall module, or modular wall, according to an implementation of the present invention may include, incorporate, or otherwise comprise properties, features, components, members, and/or elements described in other implementations, including systems, methods, products, devices, and/or implementations of the same disclosed herein. Thus, reference to a specific feature in relation to one implementation should not be construed as being limited to applications within said implementation.

Figure 8:
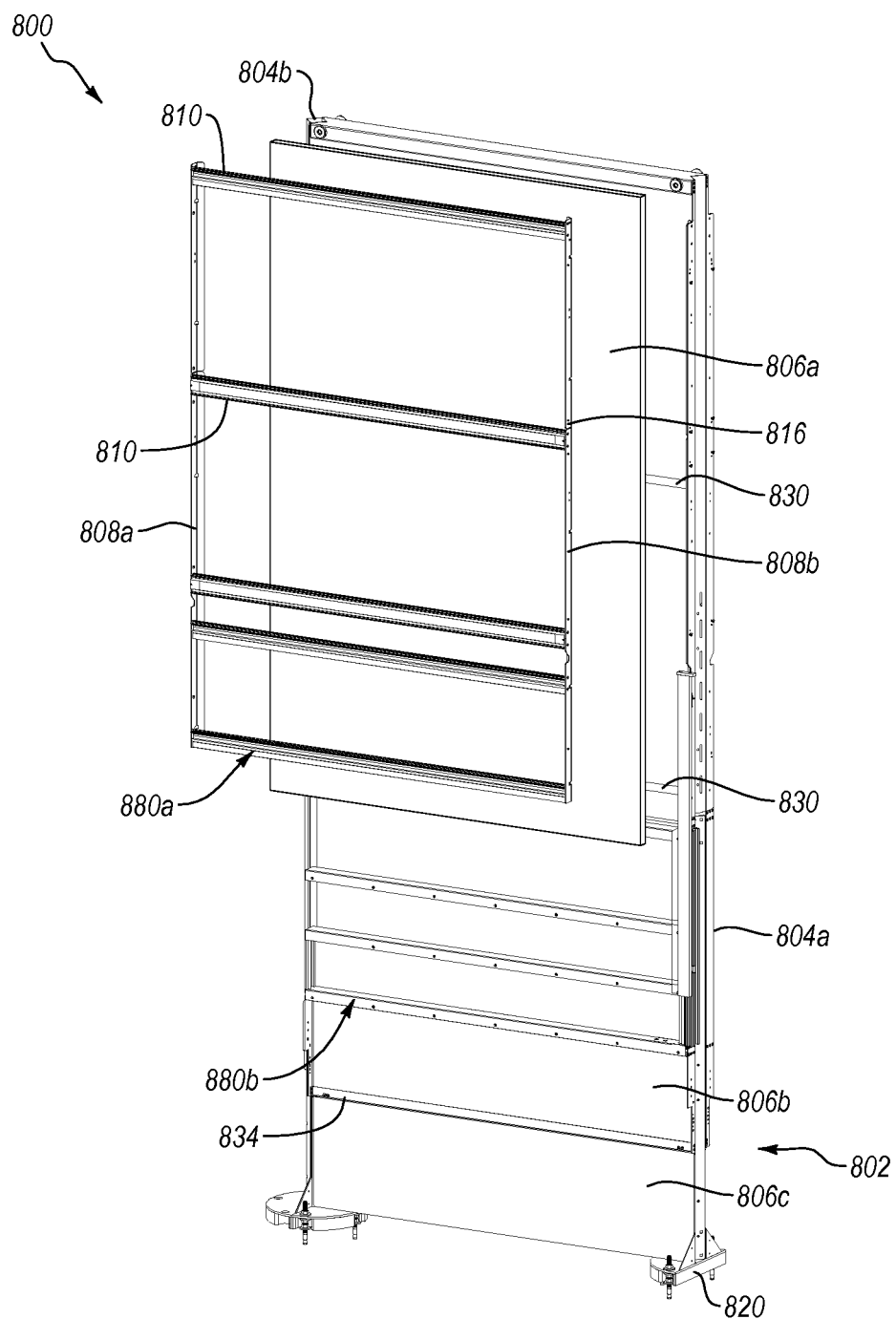
FIG. 8 illustrates a method of assembling and/or disassembling an acoustic wall module and/or modular acoustic wall in accordance with an implementation of the present invention.

Referring now to FIG. 8, certain implementations of the present invention include a method of assembling a modular acoustic wall. One or more implementations may include assembling at least one acoustic wall module 800, including a frame 802 and a plurality of wall elements. For instance, frame 802 may include at least one vertical bracket 804, which may be held in a substantially vertical position by at least one base element 820. An implementation of the present invention may further include attaching a plurality of wall elements to the frame 802.

One or more implementations may include attaching one or more structural support members 830 to the frame 802. Such structural support members may at least partially prevent elements of frame 802 from moving in at least a first direction. For instance, one or more structural support members may substantially prevent opposing vertical brackets 804a and 804b from moving closer together and/or further apart. Furthermore, one or more structural support members may also or alternatively prevent frame 802 from pivoting, twisting, or otherwise moving in an undesirable manner.

Certain implementations may include securing at least one acoustic substrate 806a to the frame 802. In at least one implementation, one or more ladder or ladder frames 880a (e.g., ladder or ladder frames 880a, 880b) are used to secure acoustic substrate 806a to the frame 802. As illustrated, ladder or ladder frame 880a includes a plurality of horizontal support members 810 coordinated by a first substrate retaining member 808a and a second substrate retaining member 808b. One will appreciate, however, that in certain implementations, a ladder or ladder frame 880a may include one or more horizontal support member 810 attached to one or more substrate retaining members 808a, 808b such that at least one element of the ladder or ladder frame 880a secures the acoustic substrate 806a to the frame 802 by attachment thereto.

In at least one implementation, substrate retaining members 808a, 808b may be configured such that angles similar to angles 131a, 131b illustrated in FIG. 3 may remain substantially unchanged throughout the illustrative method of assembling a modular acoustic wall or wall module. For instance, substrate retaining members 808a, 808b may include or otherwise be formed of a substantially rigid material, such as metal or metal alloy, illustratively. In other implementations, however, substrate retaining members 808a, 808b may be configured such that angles similar to angles 131a, 131b illustrated in FIG. 3 may increase and/or decrease during the illustrative method. For instance, substrate retaining members 808a, 808b may include or otherwise be formed of a material possessing at least one flexible property. In certain implementations, substrate retaining members 808a, 808b may exhibit flexibility within a defined range of angles, and substantial rigidity beyond said defined range of angles. Properties related to material flex and/or flexibility are known in the art and contemplated herein. Furthermore, other angles and the like disclosed herein may include similar properties related to rigidity and/or flexibility as discussed herein.

In an illustrative implementation, at least one ladder or ladder frame 880a is assembled. A ladder or ladder frames 880a may be assembled on or off the frame 802. In some implementations, a plurality of ladder or ladder frames 880a, 880b, each including a plurality of horizontal support members 810 coordinated by a first substrate retaining member 808a and a second substrate retaining member 808b, are assembled off of the frame, prior to complete assembly of the acoustic wall module 800 or modular acoustic wall. Respective first ends of the horizontal support members 810 are attached to a first surface or arm (see e.g., FIG. 3; first arm 127a) of a first substrate retaining member 808a, and respective second ends of the horizontal support members 810 are attached to a first surface or arm (see e.g., FIG. 3; first arm 127b) of a second substrate retaining member 808b. Furthermore, each of the horizontal support members 810 are attached at a different longitudinal position on the substrate retaining members 808a, 808b such that the horizontal support members 810 are suspended between the substrate retaining members 808a, 808b in a ladder-like formation.

One will appreciate, however, that the present invention is not so limited, and that other configurations of ladders or ladder frames are contemplated herein. Furthermore, in certain implementations, one or more substrate retaining members 808a, 808b may be used to secure the at least one acoustic substrate 806 to the frame 802 and/or vertical brackets 804a, 804b. Likewise, horizontal support members 810 may be attached to one or more substrate retaining members 808a, 808b and/or directly to the frame 802 and/or vertical brackets 804a, 804b without being assembled into a ladder or ladder frame 880a.

In an illustrative implementation, one or more acoustic substrates 806a are placed against frame 802 and/or vertical brackets 804a, 804b. The acoustic substrate 806a may be positioned by lifting the substrate and pushing it against the frame 802 and/or vertical brackets 804a, 804b. In another implementation, acoustic substrate 806 may be positioned by lifting the substrate and sliding it into place between elements of the frame 802 and/or vertical brackets 804a, 804b (see e.g., FIG. 9). In at least one implementation, frame 802 and/or vertical brackets 804a, 804b include one or more substrate securing elements (not shown) configured to retain the acoustic substrate at least temporarily.

An implementation of the present invention may also include securing the one or more acoustic substrates 806a to the frame 802 and/or vertical brackets 804a, 804b via one or more ladder or ladder frames 880a. A ladder or ladder frame 880a may be secured to the frame 802 and/or vertical brackets 804a, 804b, thereby securing the one or more acoustic substrates 806a to the frame 802 and/or vertical brackets 804a, 804b. Furthermore, a ladder or ladder frame 880a may be secured to the frame 802 and/or vertical brackets 804a, 804b via one or more fasteners 816.

In an illustrative implementation, the acoustic substrate 806 may be positioned against a surface, arm, extension element, or other portion of the vertical brackets 804a, 804b, similar to arm 105a, 105b illustrated in FIG. 3, and the ladder or ladder frame 880a may be attached to a separate surface, arm, extension element, or other portion of the vertical brackets 804a, 804b, similar to extension element 109a, 109b illustrated in FIG. 3. The attachment of the ladder or ladder frame 880a to the vertical brackets 804a, 804b may apply a compressive force against the acoustic substrate 806a such that the acoustic substrate 806a is pinched between at least a portion of the ladder or ladder frame 880a and at least a portion of the vertical brackets 804a, 804b.

In at least one implementation, an assembler can assemble a wall module 800 by placing at least one first acoustic substrate 806b at the bottom of wall module 800, and installing a first ladder or ladder frame 880b to hold the acoustic substrate 806b in place. The assembler can also place another sheet of acoustic substrate 806a on top of the first acoustic substrate 806b and install a second ladder or ladder frame 880a to hold the acoustic substrate 806a in place. One will appreciate, however, that other orders of assembly and/or installation are contemplated herein. For instance, in certain implementations, an upper acoustic substrate 806a may be installed first. In another implementation, a base acoustic substrate 806c may be installed in a lower portion of the frame 802 and/or wall module 800, illustratively below a lower support element 834.

In at least one implementation, an assembler can join the lower and upper acoustic substrates 806a, 806b by a tongue and groove or other connection, including any additional adhesives or fasteners. An assembler may also separate base acoustic substrate 806c from lower acoustic substrate 806b with a lower support element 834. In certain implementations, base acoustic substrate 806c is configured to be positioned beneath or below at least part of a floor or sub-floor. Upon assembly, the horizontal support members 810 of the ladder frames 880a, 880b become the horizontal support members of the wall module 800 on the previously "naked side." After installation of the one or more ladder or ladder frames 880a, 880b, the assembler can then place finishing elements on the wall module 800 by attaching any exterior wall elements or other sheets or tiles thereto. The exterior wall elements and/or finishing sheets or tiles can be structural or decorative in nature, as desired.

Figure 9:
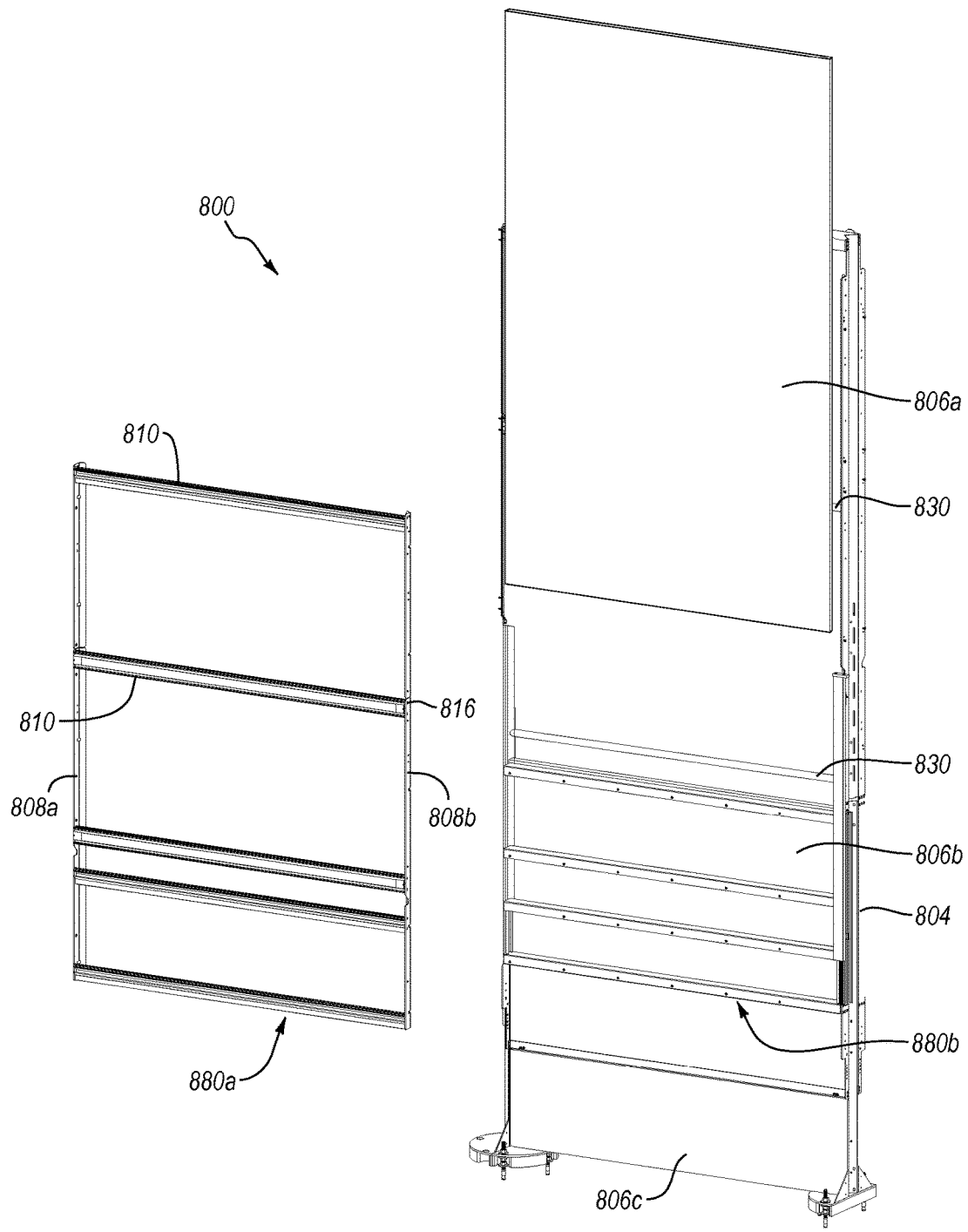
FIG. 9 illustrates a method of assembling and/or disassembling an acoustic wall module and/or modular acoustic wall in accordance with another implementation of the present invention.

Referring now to FIG. 9, in at least one implementation, the ladder or ladder frames 880a, 880b may be removed at least temporarily to remove the acoustic substrates 806a, 806b from the wall module 800. This removal is further understood in context with the vertical framebrackets 104, 104a, 104b shown in FIGS. 2-3. Specifically, the frame 102 of FIG. 3 illustrates at least one implementation for holding the acoustic substrate 106 in place, wherein the vertical framebrackets 104a, 104b include flattened "M" shaped brackets that enables a slotted configuration with another opposing M-shaped framebracket. The illustrated "M" configuration may or may not be configured for a pressure fit for the acoustic substrate, but nevertheless enables the acoustic substrate 106 to be lifted or slid out of the vertical frame upon removal of the ladder frame 880a, 880b (FIG. 9).

In addition to the foregoing, one will appreciate that implementations of the present invention can be modified in any number of ways. For example, the vertical brackets or side frame components 804 can be any length to span any ceiling height, and the ladder frames 880a, 880b can be stacked side by side or top to bottom to add horizontal and vertical structure, as desired. Accordingly, one will appreciate that implementations of the present invention can enable a manufacturer or assembler to assemble as much as needed or preferred of a wall module 800 in the factory, and then to easily assemble or stand the structure, and add the acoustic substrates 806a, 806b where desired. The assembled walls provide excellent acoustic properties without sacrificing any required structural stability or rigidity.

In addition to features already disclosed herein, a modular wall according to certain implementations may include one or more acoustic tiles. An acoustic tile may include a substrate layer and a veneer layer. The substrate layer may include a plurality of holes extending at least partially through the substrate layer. Similarly, the veneer layer may have a plurality of micro-perforations (or microholes) extending at least partially through the veneer layer. The veneer layer may be attached to the substrate layer, so as to provide the resulting acoustic tile with desired acoustic properties, such as noise reduction characteristics. Such acoustic tiles may be attached to an interior portion of a modular wall frame (similar to the above-described acoustic substrates) or to an exterior portion of a modular wall frame (similar to the above-described exterior wall elements).

Figure 10:
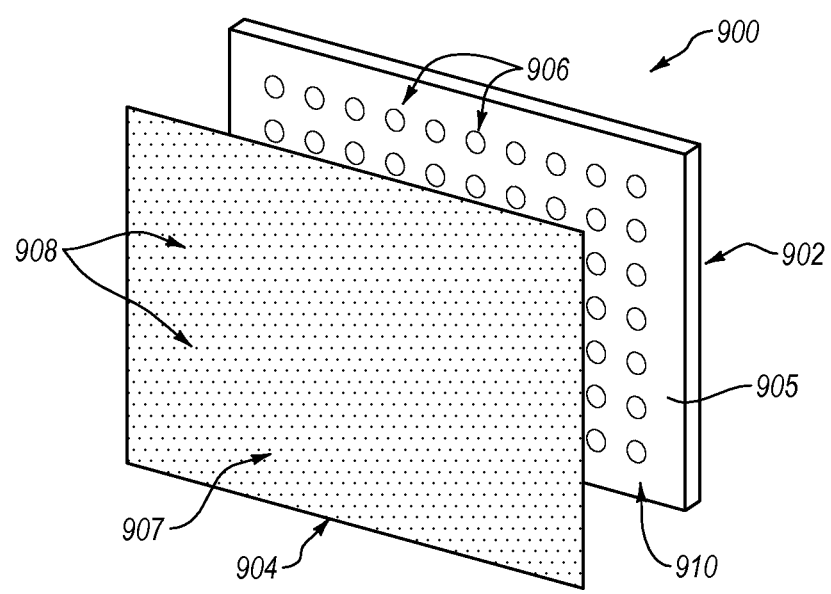
FIG. 10 illustrates a perspective view of a substrate layer and a veneer layer that can be attached to form an acoustic tile.

In FIG. 10, an exploded view of one implementation of an acoustic tile 900 is shown. As illustrated, the acoustic tile 900 includes a substrate layer 902 and a veneer layer 904. Various materials may be used to make up the substrate layer 902 and the veneer layer 904. For instance, similar to the other acoustic substrate layers described herein, the substrate layer 902 may be formed of an MDF sheet material, or other materials known in the art. The substrate layer 902 and/or the veneer layer 904 may further include a thermofoil surface finish. Additional layers may be incorporated, for example, in between the substrate layer 902 and the veneer layer 904 or on exterior sides of the substrate layer 902 and the veneer layer 904.

In certain implementations, the veneer layer 904 may include an aesthetic display or appearance. For example, the veneer layer 904 may include an outer surface that provides structural and/or aesthetic appeal suitable for a residential, commercial, industrial, governmental, educational, and/or other building or environment. Furthermore, the outer surface of the veneer layer 904 may function as an outer or exterior surface of a wall, divide, barrier, or other architectural and/or decorative structural element. The veneer layer 904 may also or alternatively function as a ceiling, floor, subfloor, or any other architectural and/or decorative structural element.

The substrate layer 902 and the veneer layer 904 may have the same or different dimensions in length or width. Also, the substrate layer 902 and the veneer layer 904 may be fabricated in a variety of gauges or other measure of thickness. For instance, the substrate layer 902 according to some implementations may include one or more materials configured into a sheet or tile having a gauge of about 0.25 inches, about 0.5 inches, about 0.75 inches, about 1.0 inches, about 1.25 inches, and so forth. A range may include, for example, a gauge from about 0.25 inches to about 0.75 inches in thickness. Other implementations may include a substrate layer 902 having a gauge of less than about 0.25 inches or a gauge greater than about 1.25 inches. At least one implementation includes a plurality of substrate layers 902, each having a suitable gauge or thickness for an intended purpose. The substrate layer 902 according to certain implementations may be fabricated as a sheet, tile, board, or other elongated and substantially flat material such that the substrate layer 902 has a continuous thickness throughout. In other implementations, the substrate layer 902 may have a varying thickness.

The veneer layer 904 may have gauges similar to, smaller than, or larger than the gauges of the substrate layer 902. For instance, the veneer layer 904 according to some implementations may include one or more materials configured into a sheet or tile having a gauge of about 0.05 inches, about 0.1 inches, about 0.25 inches, about 0.5 inches, about 0.75 inches, about 1.0 inches, about 1.25 inches, and so forth.

Additional layers may be incorporated in the acoustic tile 900. The additional layers may have the same or different dimensions and widths as the substrate layer 902 and the veneer layer 904. For example, one or more of the additional layers may cover only half of the substrate layer 902, the veneer layer 904, or other layers. Alternatively, one or more of the additional layers may have surface areas that are greater than the substrate layer 902, the veneer layer 904, or other layers. Additionally, one or both of the substrate layer 902 and the veneer layer 904 may be comprised of multiple layers. The multiple layers may have similar or varying dimensions and thicknesses.

The substrate layer 902 and the veneer layer 904 may be attached together by an adhesive. Alternatives to adhesive may also be used, including mechanical fasteners. The process for attaching the substrate layer 902 and the veneer layer 904 may also or alternatively include the application of pressure and/or heat to create a bond therebetween.

Industrial sheet goods are often processed in standard sizes and then later cut down to size to be applied to ceilings, floors, or surfaces of existing walls. An acoustic tile 900, however, may be custom cut to fit any desired wall or ceiling space. Accordingly, the entire acoustic tile 900 may be made to the exact parametric size and shape needed for a project.

As can be seen in FIG. 10, a plurality of holes 906 extend at least partway through the substrate layer 902. More specifically, the plurality of holes 906 extend into a major surface 905 of the substrate layer 902 and at least partially through the thickness of the substrate layer 902. The depth of the plurality of holes 906 may vary from one implementation to another. For instance, in some implementations, the depth of the plurality of holes 906 may be equal to about 10%, about 25%, about 50%, about 75%, or about 90% of the thickness of the substrate layer 902. In other implementations, the plurality of holes 906 may extend entirely through the substrate layer 906. In some implementations, each of the plurality of holes 906 has a depth that is substantially equal to the depths of the other holes. In other implementations, the depths of some holes 906 may differ from one another.

In addition to the depth of the plurality of holes 906, the shapes and sizes of the plurality of holes 906 may vary from one implementation to another. For instance, the holes 906 may be generally circular with diameters of about 0.25 inches, about 0.5 inches, about 0.75 inches, about 1 inch, and the like. In some implementations, the plurality of holes 906 may be non-circular. Nevertheless, the plurality of holes 906 may have cross-sectional, perimeter, or other dimensions equal to about 0.25 inches, about 0.5 inches, about 0.75 inches, about 1 inch, and the like.

The spacing, positioning, and/or arrangement of plurality of holes 906 may vary from one implementation to another. For instance, the spacing between the plurality of holes 906 may be equal or unequal. The plurality of holes 906 may be arranged to form patterns and/or designs as desired to provide desired acoustic properties to the acoustic tile 900. Such patterns and designs may include a variety of shapes, such as circles, spirals, squares, hexagons, triangles, ovals, rectangles, as well as other regular, non-regular, uniform, and non-uniform patterns or designs.

As with the spacing, positioning, and arrangement of the plurality of holes 906, the amount of the major surface 905 covered by the plurality of holes 906 may vary from one implementation to another. For instance, the plurality of holes 906 may cover about 10%, about 25%, about 50%, about 75%, or about 90% of the major surface 905.

The spacing, positioning, and/or arrangement of the plurality of holes 906 may, at least in part, be dictated by the desired acoustic properties of the acoustic tile 900. Changing the spacing, positioning, and/or arrangement of the plurality of holes may increase, decrease, and/or alter the acoustic properties of the acoustic tile 900.

Similarly, the spacing, positioning, and/or arrangement of the plurality of holes 906 may, at least in part, be dictated by desired structural characteristics and/or the manner in which the acoustic tile 900 is connected to a frame of a wall module. For instance, the plurality of holes 906 may be positioned in the substrate 902 so as to maintain or minimally diminish the structural integrity of the substrate 902.

Additionally, the plurality of holes 906 may be arranged to allow for ready connection of the acoustic tile 900 to a frame of a wall module. Thus, for instance, the plurality of holes 906 may be positioned so as to create a connection region 910 that is without holes 906. In the illustrated implementation, the connection region extends along edges of the substrate layer 902. Connectors, attachment members, adhesives, and the like may be applied to the connection region 910 to facilitate secure connection of the acoustic tile 900 to a frame of a wall module. The size and location(s) of the connection region 910 may vary from one implementation to another. For instance, the connection region 910 may, as illustrated in FIG. 10, extend along one or more edges of the substrate layer 902. In such an implementation, the connection region may have a width in a range between about 0.1 inches and about 3 inches. In some implementations, the width of the connection region 910 is about 0.25 inches, about 0.5 inches, about 0.75 inches, about 1 inch, about 2 inches, and about 3 inches. The connection region 910 may also or alternatively be positioned away from the edges of the substrate layer 902. The size and location of the connection region 910 may depend on the type of connectors being used to connect the acoustic tile 900 to a wall module frame.

The veneer layer 904 may include microholes 908. The microholes 908 may extend partially or entirely through the veneer layer 904. Similar to the plurality of holes 906 in the substrate layer 902, the size, position, and arrangement of the microholes 908 may vary from one implementation to another. For instance, the microholes 908 may have diameters that range in size from smaller than about 0.5 mm to larger than about 0.9 mm, and anywhere therebetween. In some implementations, the veneer layer 904 includes approximately 30,000 microholes per square foot. In other implementations, the veneer layer 904 includes fewer or more than 30,000 microholes per square foot.

As illustrated in FIG. 10, the microholes 908 may cover all of a major surface 907 of the veneer layer 904. In other implementations, however, portions of the veneer layer 904 may not include microholes 908. For instance, the veneer layer 904 may include a connection region (that may or may not correspond to connection region 10) that is without microholes 908 to facilitate connection of the acoustic tile 900 to a wall module frame. The microholes 908 (and/or areas devoid of microholes 908) may also or alternatively be arranged in patterns to provide desired acoustic and/or aesthetics characteristics to the acoustic tile 900.

In some implementations, the plurality of holes 906 and the microholes 908 may be aligned or otherwise positioned relative to each other. For example, some or all of the plurality of holes 906 and the microholes 908 may be arranged relative to each other to provide desired acoustic features or aesthetic effects. For example, a hued veneer layer 904 that has transparencies may present pleasing variations in color that depend on the sizing and placement of plurality of holes 906 in the substrate layer 902.

Given that the plurality of holes 906 and the microholes 908 may be custom designed to whatever size, dimension, and pattern is desired, the plurality of holes 906 and the microholes 908 may be designed around whatever connectors and fasteners are used with the acoustic tile 900. Suitable types of connectors and fasteners include, for example, bolts, screws, rivets, or other hardware configured to secure two elements together by passing into and/or through both elements. Clips, brackets, ties, adhesives, fastening members, or other types of securement means are also included. With the advantage of custom designing holes around the surface space allotted for connectors and fasteners, acoustic effects may thus be preserved.

Figure 11:
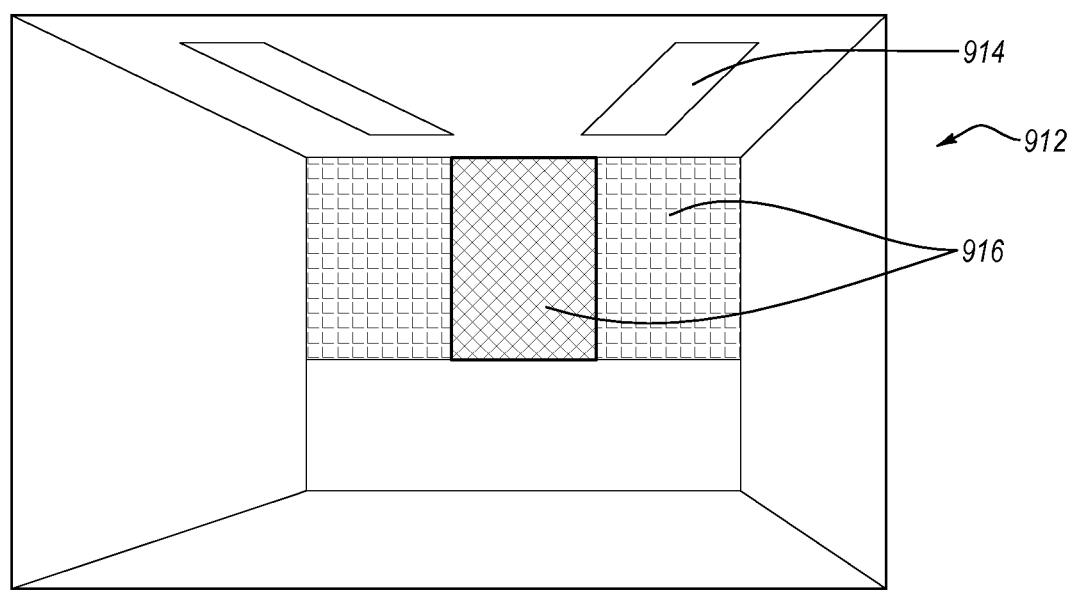
FIG. 11 illustrates acoustic tiles being used in wall structures and ceiling structures in a room.

Acoustic tiles 900 may be used for a variety of different purposes. Turning to FIG. 11, for instance, a room 912 is shown having acoustic tiles 916 used in wall structures and acoustic tiles 914 used in ceiling coverings. The acoustic tiles 914 and 916 may be similar or identical to acoustic tile 900. As shown, multiple acoustic tiles 916 may be used to form at least part a wall structure. The acoustic tiles 916 may span an entire wall length and wall height, or portions thereof. For instance, the acoustic tiles 916 may span less than an entire wall height and/or less than an entire wall length, according to desire. While the acoustic tiles 916 are shown as having similar dimensions, each acoustic tile 916 may have unique dimensions.

Applications of acoustic tiles extend beyond use in wall structures and ceiling coverings. Acoustic tiles can conceivably be placed anywhere, and at any angle, in a room. Although vertical and horizontal placement of acoustic tiles have been shown, the placement of acoustic tiles extends beyond such confines. For example, acoustic tiles may be placed at an angle with respect to ground level. Also, an acoustic tile may be suspended in air for a below ceiling mounting.

The acoustic tiles 900, 914, 916 are variable in nature, allowing a personalized wall or ceiling structure as desired. For example, modern office buildings often have modular wall structures that are less than the structural ceiling height. The space above, below, and around the modular wall structures allows audible noise, such as noise from workers, computers, and machines, to travel and disturb neighboring workers. Noise can disturb worker concentration, make it difficult to communicate quietly with others, and further make it difficult to decipher to which worker the sounds and communications are directed.

Acoustic tiles according to the present disclosure help alleviate this problem because they absorb sounds with custom-defined holes and microholes. Along with custom-defined holes and microholes, the presently disclosed acoustic tiles may be custom cut to whatever size and dimension is needed. Acoustic tiles may be square, rectangular, rounded, angled, circular, another shape, or a combination of shapes. Thus, spaces with odd angles and corners may be covered, preventing sounds from passing from one side to another side. Thus, a quiet working environment may be preserved.

Although acoustic tiles have been described with respect to office space configurations, they may easily accommodate other settings. For example, they may be used in a home environment to block out noise between rooms or define quiet living spaces, such as separate bedroom areas within a shared bedroom.

Figure 12:
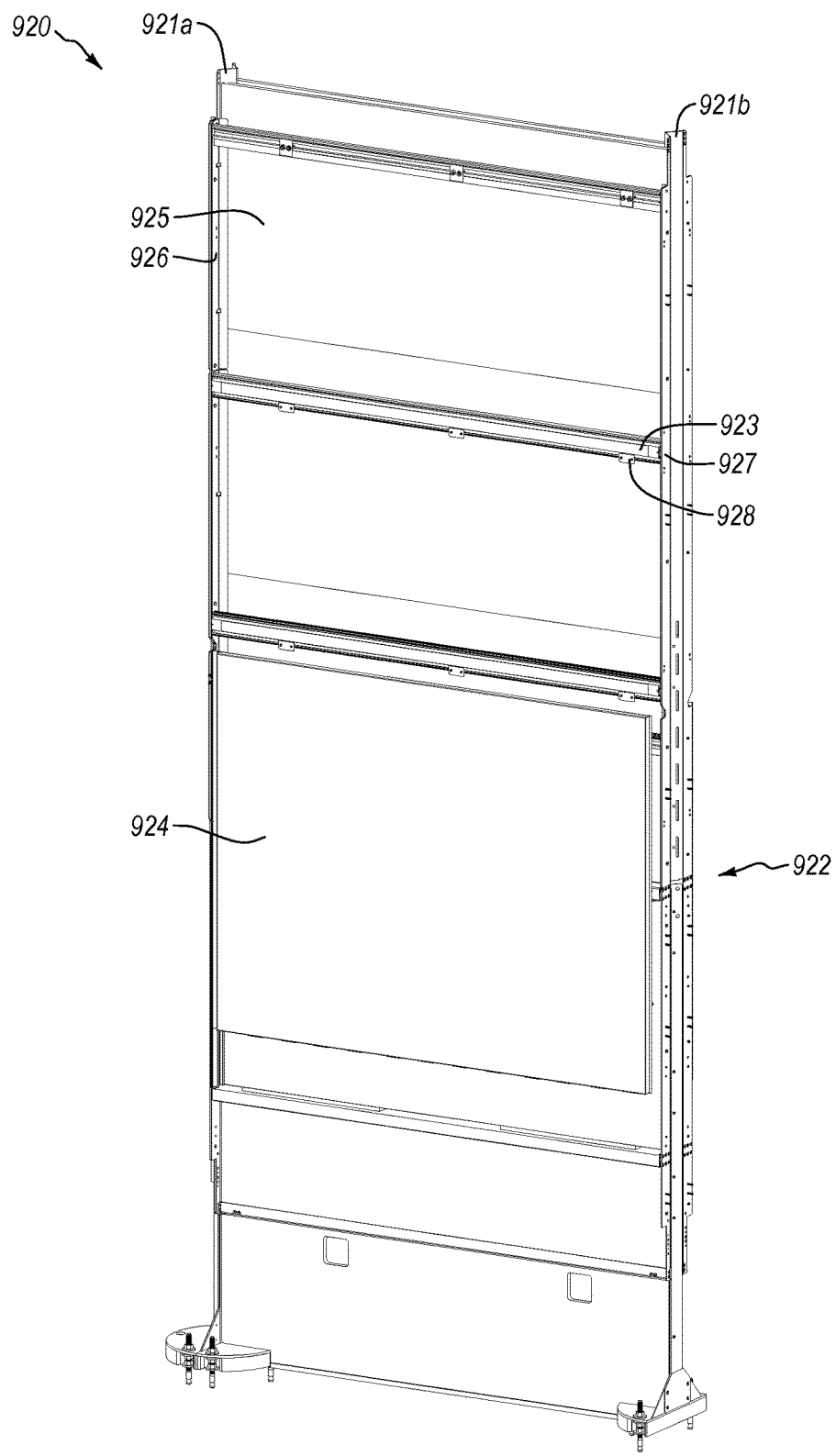
FIG. 12 illustrates a perspective view of a partially assembled acoustic wall module.

FIG. 12 illustrates a partially assembled acoustic wall module 920 that may be the same as or similar to acoustic wall module 100, but with the incorporation of one or more acoustic tiles with holes and microholes as described herein. More specifically, acoustic wall module 920 includes a frame 922 that includes opposing first and second vertical brackets 921a, 921b, and is configured to receive the plurality of wall elements illustrated. The acoustic wall module 920 also includes horizontal support members 923, retaining members 926, fasteners 927, and attachment members 928 for securing acoustic tiles to the frame 922 and which are similar or identical to horizontal support members 110, retaining members 108, fasteners 116, and attachment members 114 described herein.

Figure 13:
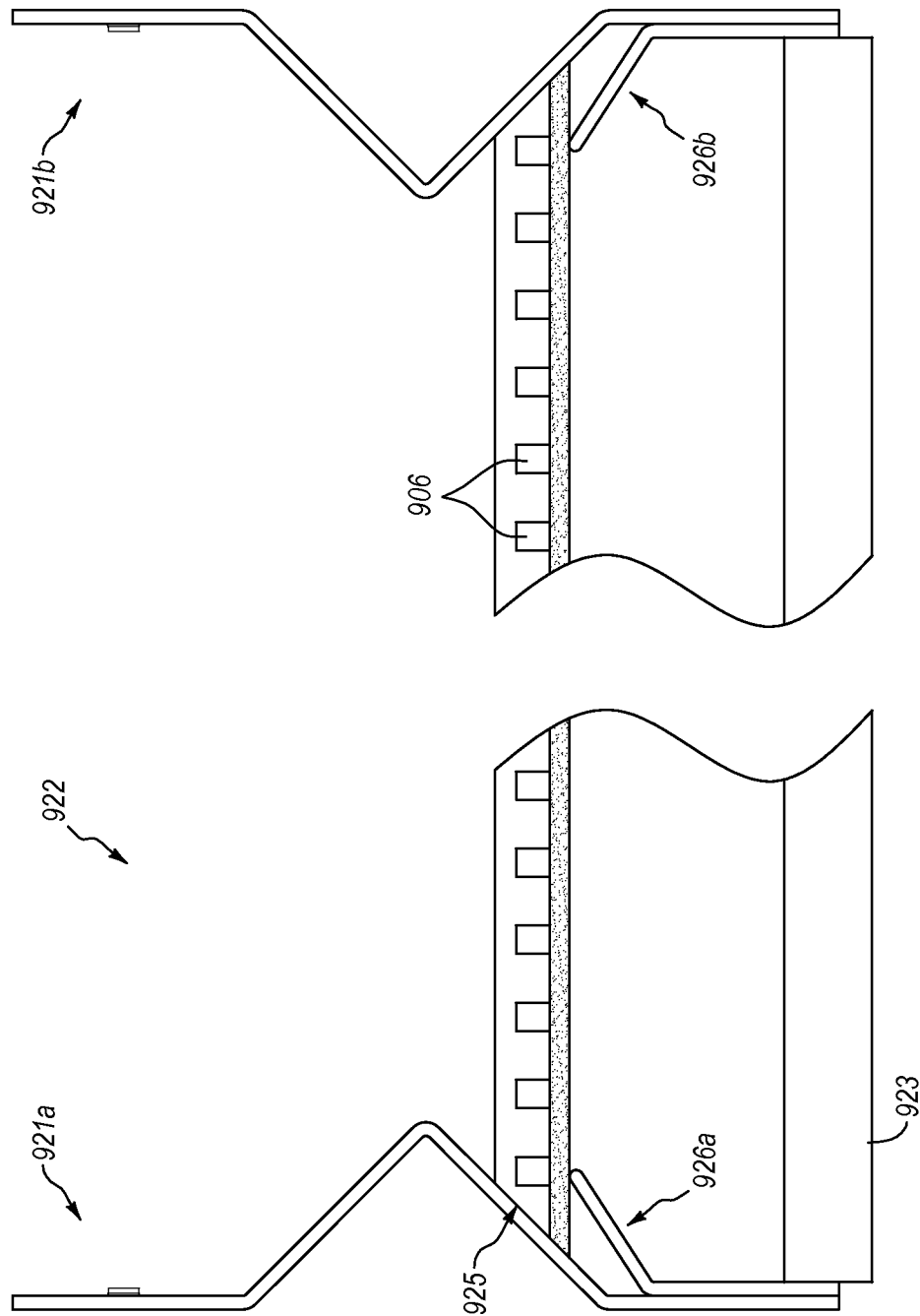
FIG. 13 illustrates a top cross-sectional view of certain features of an acoustic wall module.
Figure 14:
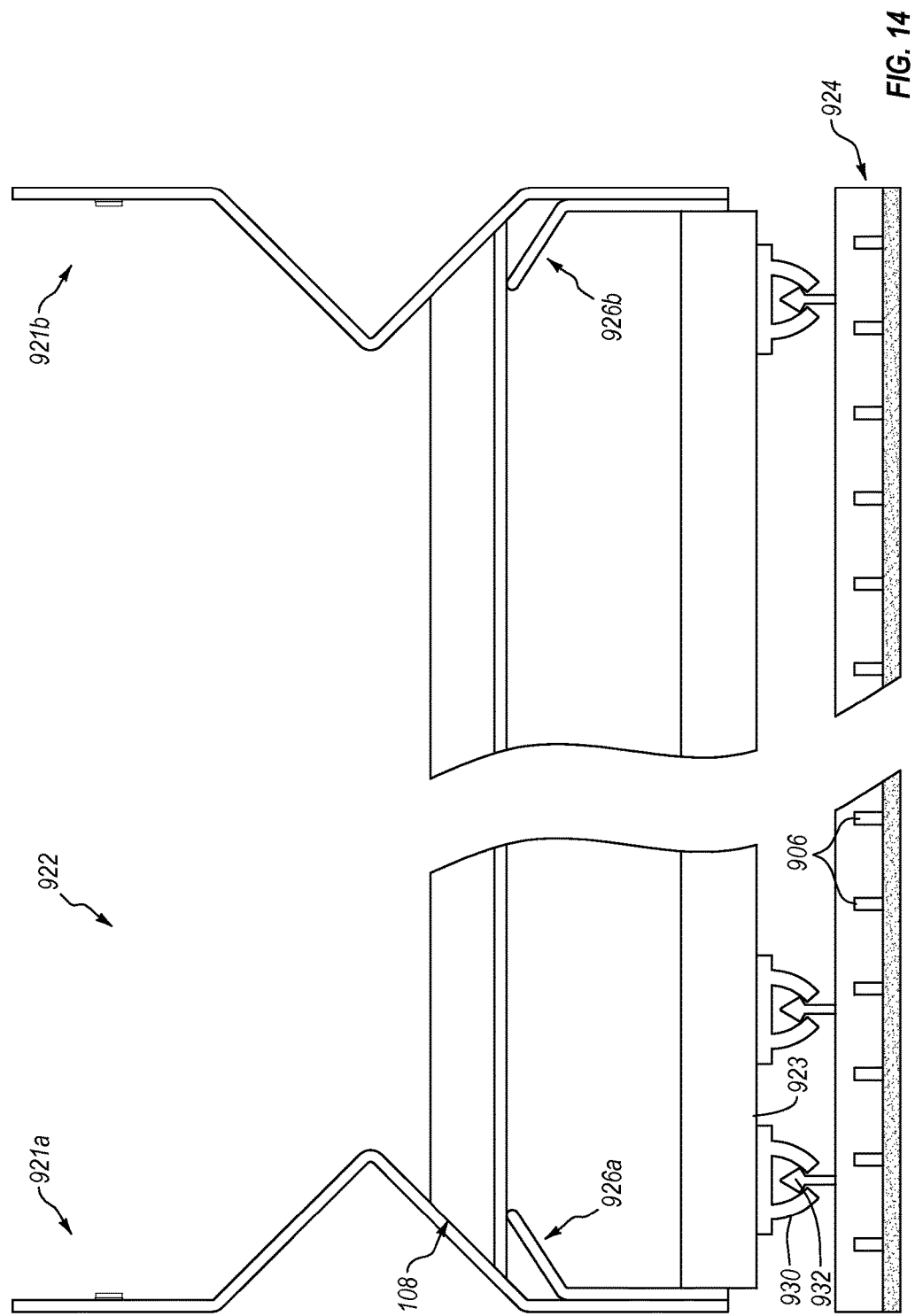
FIG. 14 illustrates a top cross-sectional view of certain features of another acoustic wall module.

According to the implementation shown in FIG. 12, acoustic wall module 920 includes an externally mounted acoustic tile 924 and an internally mounted acoustic tile 925. It will be understood that an acoustic wall module according to the present disclosure may include both internally and externally mounted acoustic tiles, or only internally mounted acoustic tiles (FIG. 13) or externally mounted acoustic tiles (FIG. 14). In implementations that include both internal and external acoustic tiles, at least one of externally mounted acoustic tile 924 and internally mounted acoustic tile 925 may be similar or identical to acoustic tile 900. In other words, at least one of the internally or externally mounted acoustic tiles may include a substrate layer with a plurality of holes and a veneer layer with microholes.

In at least one implementation that includes an internally mounted acoustic tile 925, the retaining members 926 are configured to at least partially secure acoustic tile 925 to the frame 922. Retaining member 926 may secure acoustic tile 925 to frame 922 in a manner that is similar or identical to the manner in which retaining member 108 secures acoustic substrate 106 to frame 102. More specifically, the acoustic tile 925 may be positioned at least partially between one or both of the vertical brackets 921a, 921b and at least one retaining member 926, such that the acoustic tile 925 is secured to the frame 922. For instance, FIG. 13 illustrates an acoustic tile 925 secured to the frame 922 by being compressed between vertical brackets 921a, 921b and retaining members 926a, 926b. As can be seen in FIG. 13, the acoustic tile 925 is similar to acoustic tile 900 in that it includes a substrate layer with a plurality of holes 906 and a veneer layer with microholes.

As with other implementations described herein, the acoustic wall module illustrated in FIG. 13 may include at least one exterior wall element attached to horizontal support members 923 to substantially conceal from view at least a portion of frame 922, vertical brackets 921a, 921b, acoustic tile 925, from a first vantage point. An exterior wall element may include a single sheet, tile, board configured to cover a defined area and provide a desired aesthetic to the acoustic wall module 920. The exterior wall element may be similar or identical to the other exterior wall elements (e.g., exterior wall element 112) described herein.

As noted above, FIG. 14 illustrates an acoustic wall module 922 that includes an externally mounted acoustic tile 924 that is similar to acoustic tile 900 (e.g., includes a substrate layer with plurality of holes and veneer layer with microholes). Similar to the exterior wall elements described herein, acoustic tile 924 may be configured to substantially conceal from view at least a portion of frame 920, vertical brackets 921a, 911b, acoustic substrate 108, and/or a plurality of wall elements, from a first vantage point.

Acoustic tile 924 may be fastened or otherwise secured to one or more of horizontal support member 923, retaining members 926a, 926b, and vertical brackets 921a, 921b. For instance, in an illustrative example, horizontal support member 923 and acoustic tile 924 include corresponding snap pieces that enable a snap fit securement of acoustic tile 924 to an exterior side of horizontal support member 923. As shown, snap fit elements include channel 930 connected to or extending from an exterior surface of horizontal support member 923 and bead 932 connected to or extending from acoustic tile 924 on a surface facing the exterior surface of horizontal support member 923. Bead 932 may be rounded, curved, squarish, or embody a variety of other shapes. As shown, bead 932 may have a diamond or arrow-like shape. Bead 932 snaps into channel 930, effectively securing acoustic tile 924 in a generally vertical position. Channel 930, as shown, is defined by a rounded hollow space, or curvature, that allows a snap-like fit with bead 932.

According to certain implementations, acoustic tile 924 may be positioned in a generally vertical position, tilted at an angle from a vertical position, or configured in various other positions according to desire.

Multiple snap fit elements may be used to secure acoustic tile 924 in position to horizontal support member 923. Also, snap fit pieces may be switched, such that bead 932 is attached to horizontal support member 923 and channel 930 is attached to acoustic tile 924. Instead of snap fit pieces, fasteners and/or other means of securement may be used. Acoustic tile 924 may be attached to horizontal support member 923 directly, through an attachment mechanism involving slotted and/or interlocking attachment members, frictional and/or gravitational forces, or any other suitable mechanism of direct attachment. Acoustic tile 924 may also or alternatively be attached to horizontal support member 923 indirectly via at least one clip, plate, bracket, screw, bolt, tie, adhesive, fastener, or any other material suitable for securing and/or attaching an acoustic tile 924 to a horizontal support member 923.

The present invention may be embodied and/or implemented in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An acoustic tile used for a modular wall system, comprising:
    a substrate layer having a plurality of holes extending at least partially therethrough, wherein the holes in the substrate layer are spaced unequally in a manner dictated by one or more specified structural characteristics of the acoustic tile, and are patterned to provide a specific desired acoustic property,
    a veneer layer having a plurality of micro-perforations, the veneer layer being attached to the substrate layer over the plurality of holes, the attached substrate layer and veneer layer being configured for attachment to a frame of a modular wall system, and the substrate layer and the veneer layer being configured to provide the acoustic tile with desired acoustic properties, and
    wherein the acoustic tile is at least partially secured to the frame through a compressive force applied by at least one substrate retaining member and one or more vertical brackets, wherein the compressive force is applied to the acoustic tile by the at least one substrate retaining member on a first side of the acoustic panel and the one or more vertical brackets on a second side of the acoustic tile.

2. The acoustic tile in claim 1, wherein the acoustic tile is to the frame through one or more ladder frames and configured to substantially conceal from view at least a portion of the frame from a first vantage point.

3. The acoustic tile in claim 1, wherein at least one of the substrate layer and the veneer layer comprises an MDF sheet material.

4. The acoustic tile in claim 1, wherein the plurality of holes only extend partially through the substrate layer.

5. The acoustic tile in claim 1, wherein the plurality of holes are spaced along a surface of the substrate layer such that approximately half of the surface includes holes.

6. The acoustic tile in claim 1, wherein each of the plurality of holes has a diameter within a range from about 0.25 inches to about 0.75 inches.

7. The acoustic tile in claim 1, wherein the substrate layer comprises one or more connection regions substantially devoid of holes from the plurality of holes to allow connectors to be attached to the substrate layer.

8. The acoustic tile in claim 1, wherein each of the micro-perforations has a diameter is a range from about 0.5 mm to about 0.9 mm.

9. The acoustic tile in claim 1, wherein the veneer layer includes a thermofoil surface finish.

10. The acoustic tile in claim 1, wherein the veneer layer is attached to the substrate layer using an adhesive.

11. The acoustic tile in claim 1, wherein the plurality of micro-perforations extend to edges of the veneer layer.

12. An acoustic tile used for a modular wall system, comprising:
    a substrate layer having a plurality of holes extending at least partially therethrough, wherein the holes in the substrate layer are arranged in a pattern in a manner dictated by one or more specified structural characteristics of the acoustic tile, and are patterned to provide a specific desired acoustic property,
    a veneer layer having a plurality of micro-perforations, the veneer layer being attached to the substrate layer over the plurality of holes, the attached substrate layer and veneer layer being configured for attachment to a frame of a modular wall system, and the substrate layer and the veneer layer being configured to provide the acoustic tile with desired acoustic properties, and
    wherein the acoustic tile is at least partially secured to the frame through a compressive force applied by at least one substrate retaining member and one or more vertical brackets, wherein the compressive force is applied to the acoustic tile by the at least one substrate retaining member on a first side of the acoustic panel and the one or more vertical brackets on a second side of the acoustic tile.

13. An acoustic tile used for a modular wall system, comprising:
    a substrate layer having a plurality of holes extending at least partially therethrough, wherein the holes in the substrate layer are arranged in a manner dictated by one or more specified structural characteristics of the acoustic tile, and are patterned to provide a specific desired acoustic property,
    a veneer layer having a plurality of micro-perforations, the veneer layer being attached to the substrate layer over the plurality of holes, the attached substrate layer and veneer layer being configured for attachment to a frame of a modular wall system, and the substrate layer and the veneer layer being configured to provide the acoustic tile with desired acoustic properties, the frame of the modular wall system comprising a continuous attachment feature extending substantially the entire length of the frame, wherein the attachment feature is configured to receive one or more acoustic tiles, and wherein the acoustic tile is at least partially secured to the frame through a compressive force applied by at least one substrate retaining member and one or more vertical brackets, wherein the compressive force is applied to the acoustic tile by the at least one substrate retaining member on a first side of the acoustic panel and the one or more vertical brackets on a second side of the acoustic tile.

14. The frame of the modular wall system in claim 13, wherein the attachment feature is configured to receive opposite facing acoustic tiles, making the modular wall system two-sided.

15. The acoustic tile in claim 13, wherein the depths of some holes in the substrate layer differ from one another.

* * * * *